(12) United States Patent
Ling

(10) Patent No.: US 11,567,168 B2
(45) Date of Patent: Jan. 31, 2023

(54) GAIN CONTROL IN AN ORTHOGONAL FREQUENCY DIVISION MULTIPLEXED RADAR SYSTEM

(71) Applicant: Maxlinear, Inc., Carlsbad, CA (US)

(72) Inventor: Curtis Ling, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 734 days.

(21) Appl. No.: 16/372,595

(22) Filed: Apr. 2, 2019

(65) Prior Publication Data

US 2019/0302229 A1     Oct. 3, 2019

Related U.S. Application Data

(60) Provisional application No. 62/651,352, filed on Apr. 2, 2018.

(51) Int. Cl.
*G01S 7/282* (2006.01)
*G01S 7/41* (2006.01)

(52) U.S. Cl.
CPC ............... *G01S 7/282* (2013.01); *G01S 7/41* (2013.01)

(58) Field of Classification Search
CPC .................................. G01S 7/282; G01S 7/41
USPC .......................................................... 342/82
See application file for complete search history.

(56) References Cited

U.S. PATENT DOCUMENTS

| | | | | |
|---|---|---|---|---|
| 3,882,493 A * | 5/1975 | Bolger | ................... | G01S 13/325 342/28 |
| 8,446,970 B2 * | 5/2013 | Asjadi | ................. | H04L 27/2605 370/210 |
| 8,451,882 B2 * | 5/2013 | Matsuoka | ........... | H04L 27/2627 375/222 |
| 10,126,421 B2 | 11/2018 | Ling | | |
| 10,162,053 B2 | 12/2018 | Ling | | |
| 10,175,352 B2 | 1/2019 | Ling | | |
| 10,324,179 B2 | 6/2019 | Ling et al. | | |
| 2004/0196175 A1 * | 10/2004 | Matsuoka | ............... | G01S 7/285 342/88 |
| 2006/0109170 A1 * | 5/2006 | Voigtlaender | ........... | G01S 7/023 342/159 |

(Continued)

FOREIGN PATENT DOCUMENTS

| | | | | |
|---|---|---|---|---|
| CN | 103562744 A | * | 2/2014 | ......... G01S 13/0209 |
| WO | WO-2013147948 A2 | * | 10/2013 | ......... G01S 13/0209 |

OTHER PUBLICATIONS

U.S. Appl. No. 16/372,587, filed Apr. 2, 2019.
U.S. Appl. No. 16/372,600, filed Apr. 2, 2019.

*Primary Examiner* — Vladimir Magloire
*Assistant Examiner* — Alexander L. Syrkin
(74) *Attorney, Agent, or Firm* — Buchalter; Jason W. Croft

(57) ABSTRACT

A radar system comprises a transmitter and a receiver. The radar system is operable to define a near range and a far range. The radar system is operable to, during each one of a plurality of time intervals, repeatedly transmit, via the transmitter, a plurality of OFDM symbols. The transmitter is operable to select a transmit power for the transmission during the one of the time intervals based on from which of the near range and the far range reflections of the OFDM symbols are to be received during the one of the time intervals. The receiver is operable to receive reflections of the OFDM symbols, and process, in the receiver, the reflections of the OFDM symbols to detect objects within the near range and the far range.

20 Claims, 20 Drawing Sheets

(56) References Cited

U.S. PATENT DOCUMENTS

| | | | |
|---|---|---|---|
| 2011/0109494 A1* | 5/2011 | Asano | G01S 7/34 |
| | | | 342/134 |
| 2012/0235857 A1* | 9/2012 | Kim | G01S 13/931 |
| | | | 342/134 |
| 2014/0313071 A1* | 10/2014 | Mccorkle | G01S 13/106 |
| | | | 342/202 |
| 2016/0349365 A1 | 12/2016 | Ling | |
| 2016/0356885 A1* | 12/2016 | Hakobyan | G01S 7/352 |
| 2017/0254893 A1* | 9/2017 | Evans | G01S 13/723 |

* cited by examiner

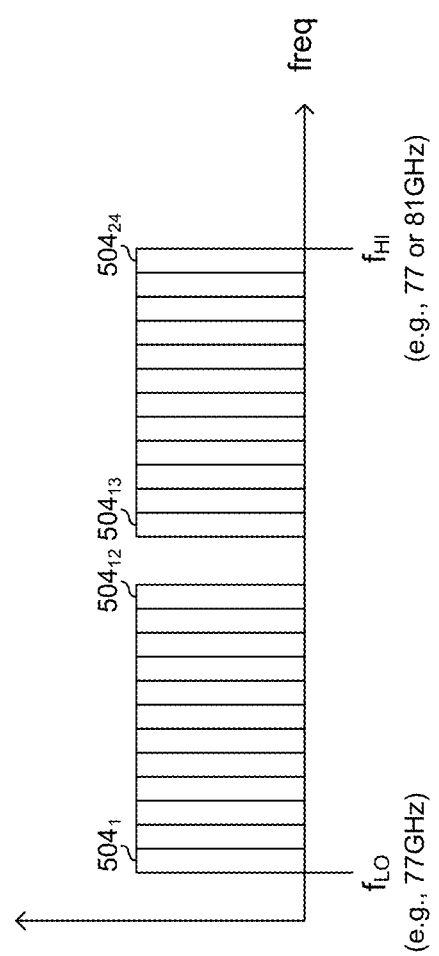

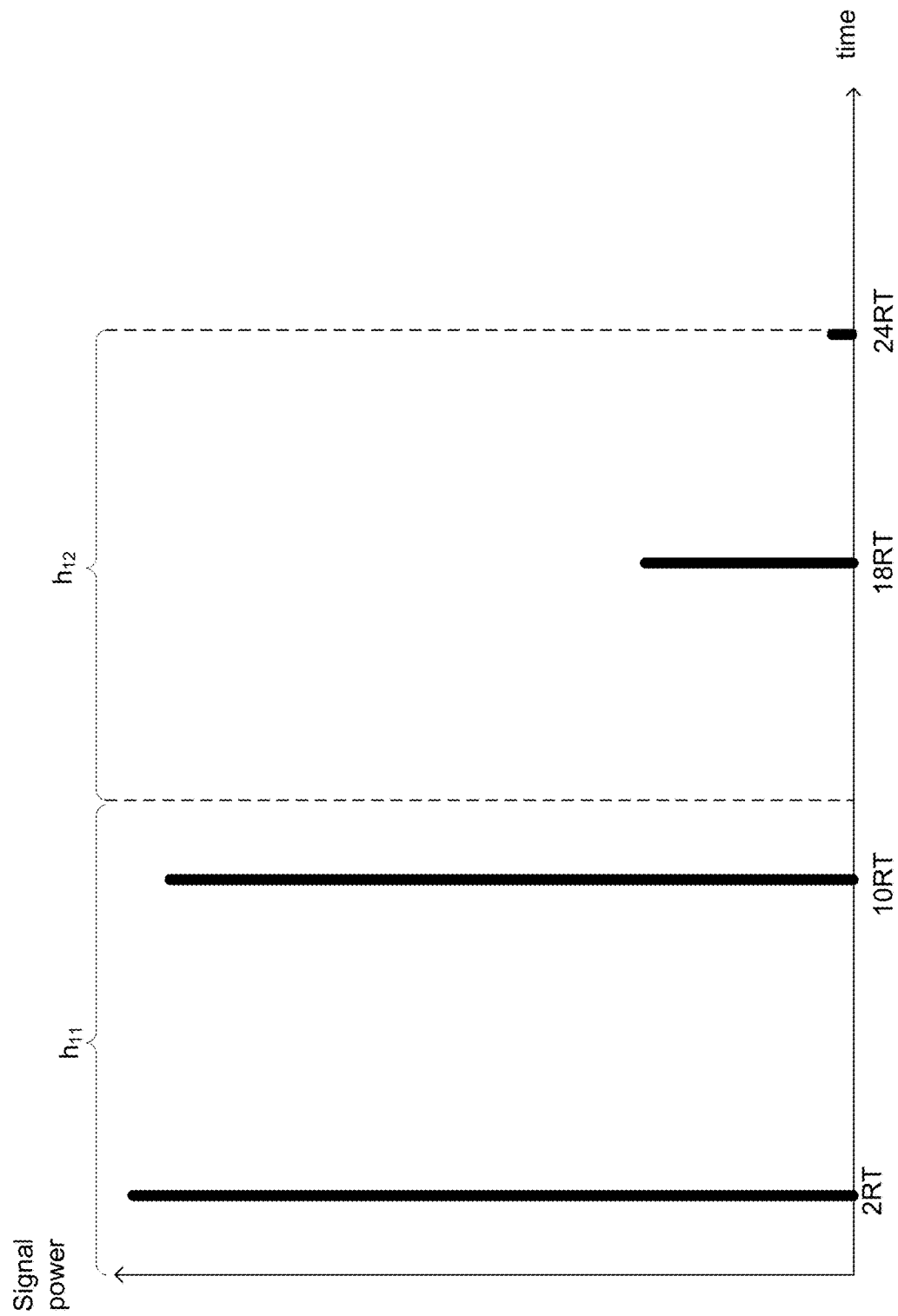

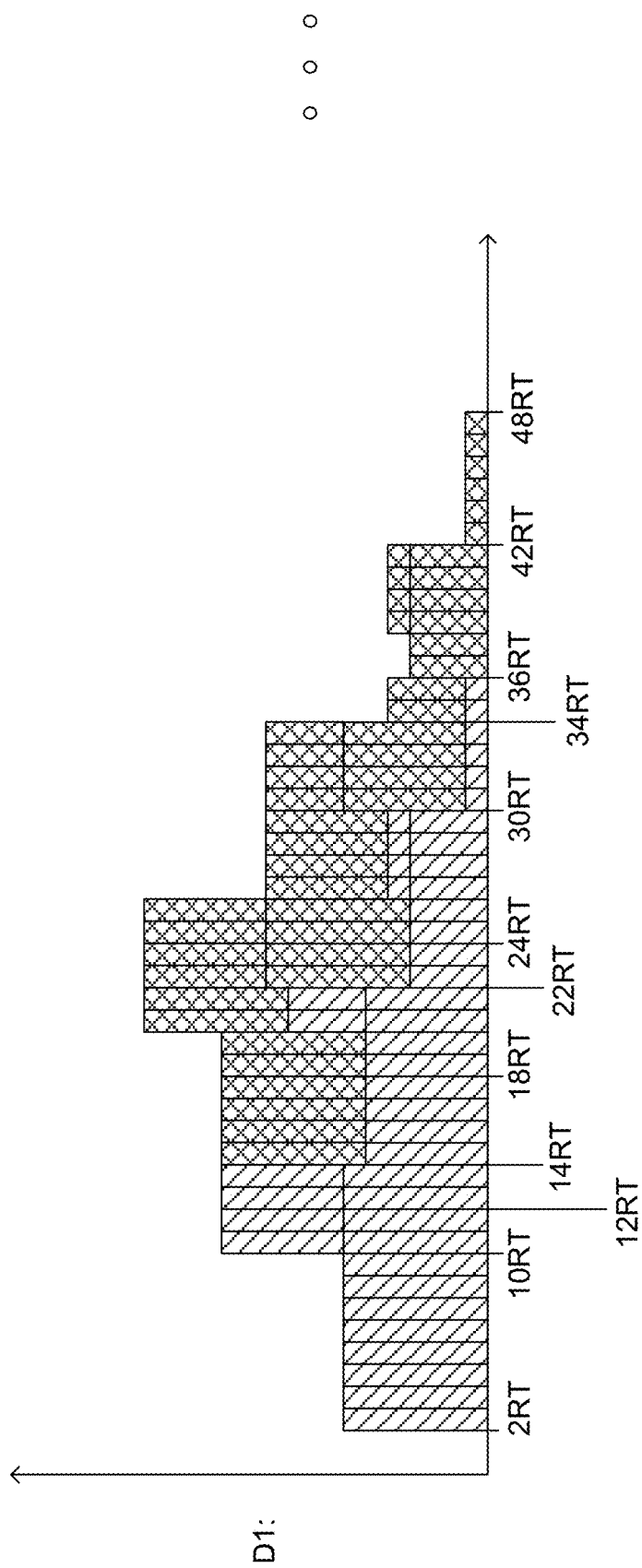

GAIN CONTROL IN AN ORTHOGONAL FREQUENCY DIVISION MULTIPLEXED RADAR SYSTEM

This application claims priority to U.S. provisional patent application 62/651,352 titled "Gain Control in an Orthogonal Frequency Division Multiplexed Radar System" filed Apr. 2, 2018, the entirety of which is hereby incorporated herein by reference.

BACKGROUND

Limitations and disadvantages of conventional radar systems and methods will become apparent to one of skill in the art, through comparison of such approaches with some aspects of the present method and system set forth in the remainder of this disclosure with reference to the drawings.

BRIEF SUMMARY

Methods and systems are provided for gain control in an OFDM Radar System, substantially as illustrated by and/or described in connection with at least one of the figures, as set forth more completely in the claims.

BRIEF DESCRIPTION OF THE DRAWINGS

FIG. 5A shows one direction of an example OFDM frame transmitted by a phased array radar system in accordance with an example implementation of this disclosure.

FIG. 5C shows the channel response of the scene of FIG. 5B.

FIG. 5E shows the radar returns of the signal of FIG. 5D transmitted into the scene of FIG. 5B.

DETAILED DESCRIPTION

Figure 1A:
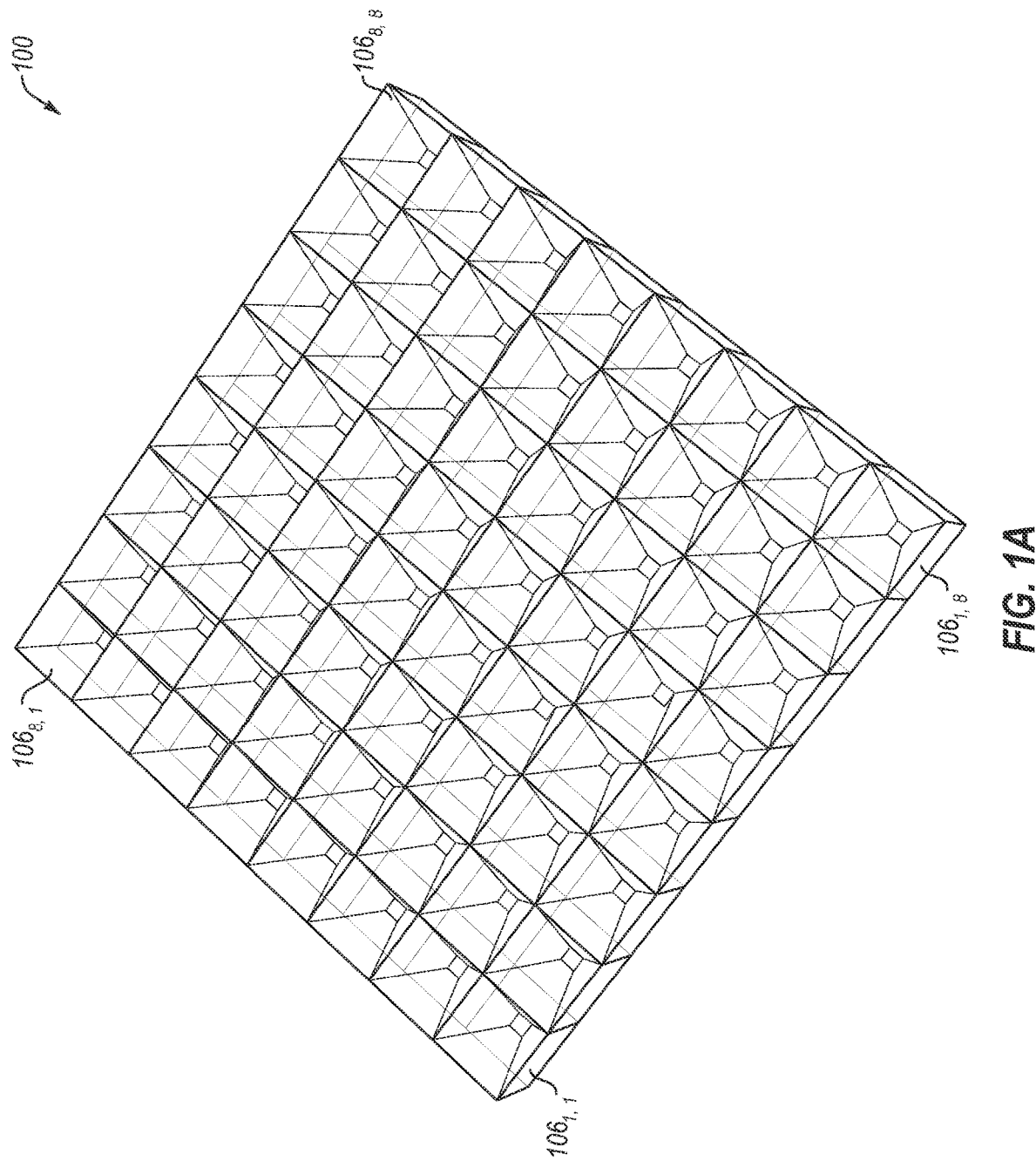
FIGS. 1A-1C show an example phased array system in accordance with an example implementation of this disclosure.
Figure 1B:
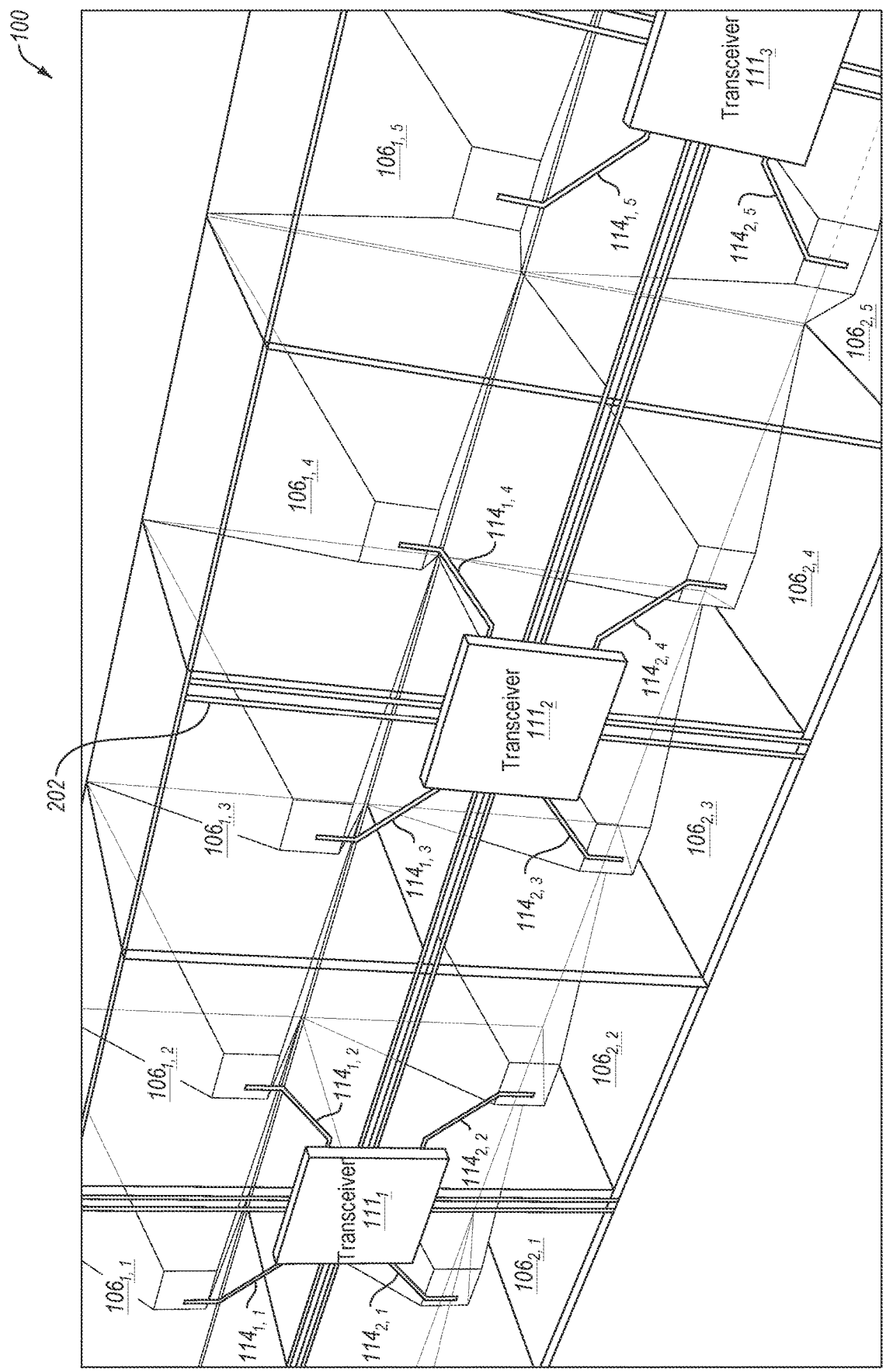
Figure 1C:
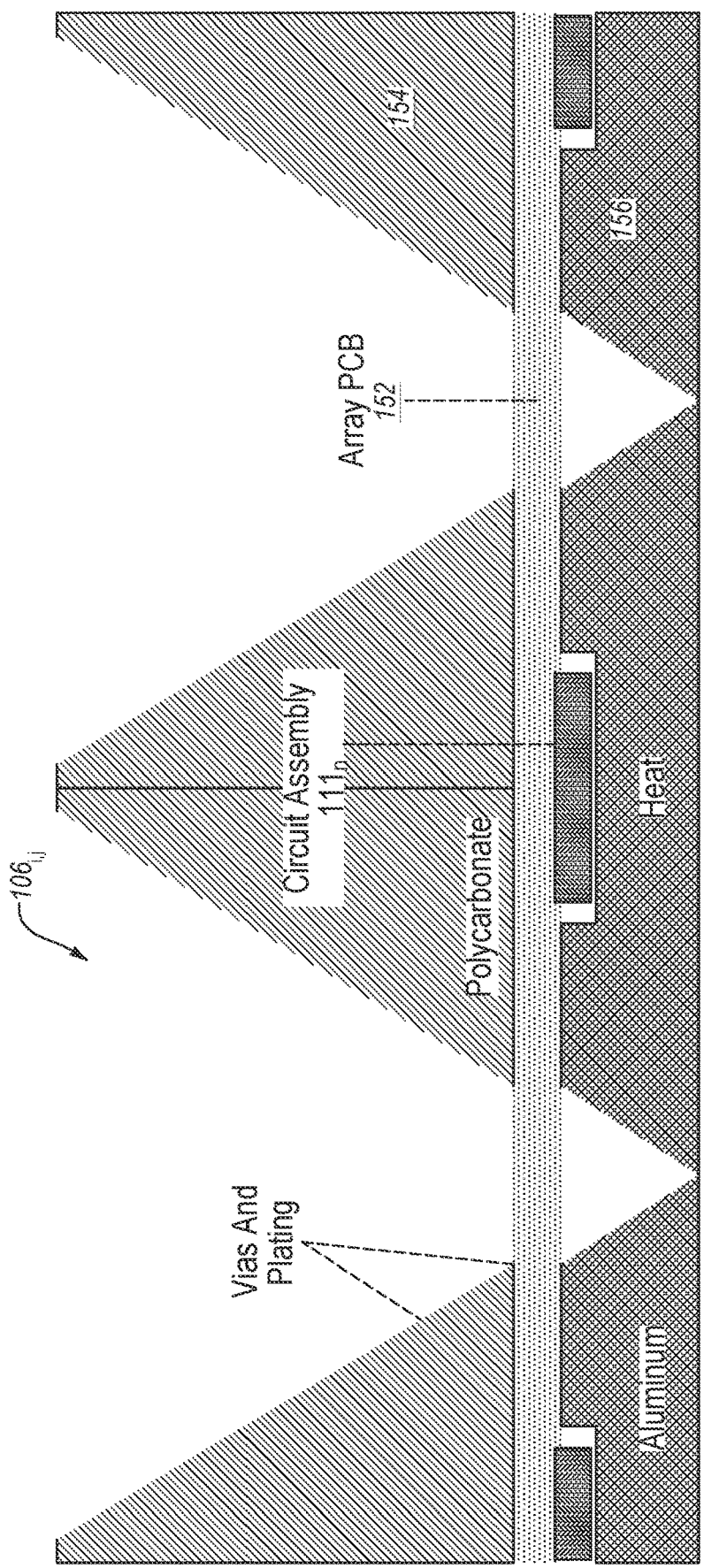

FIG. 1A-1C illustrate an example phased array system 100. FIG. 1A shows a front view and FIG. 1B shows a rear view.

The phased array system 100 comprises a plurality of antenna element elements arranged in a 2-dimensional array. Each antenna element is called out as $106_{i,j}$, where i is an integer corresponding to the antenna element's row index in the array ($0<=i<=I$) and j is an integer corresponding to the antenna element's column index in the array ($0<=j<=J$). In the example shown there are 8 antenna elements in each row and 8 antenna elements in each column, (i.e., I=8 and J=8), but in practice any number of antenna elements may be used. The transmission and reception of signals by the system 100 may take advantage of beamforming and may be particularly configured for addressing possible issues (interference, etc.) and/or to provide added features, as described below.

The example phased array system 100 of FIGS. 1A-1C comprises an array of N antenna element elements 106 (e.g., N=64 elements, in 8×8 arrangement, as shown in the non-limiting example implementation illustrated in FIG. 1A), and one or more circuit assemblies 111, coupled to the antennas 106 via antenna feeds 114, for handling and/or supporting transmission and reception of signals via the array of antenna element elements 106. Each circuit assembly $111_n$ is operable to perform various signal processing related functions, as well as (optionally) other functions (e.g., control, storage, etc.) in support of the transmission and reception of signals via the antenna elements 106. In the example implementation shown, the system 100 comprises N (an integer) circuit assemblies $111_n$ ($1<=n<=N$), each of which is operable to transmit and/or receive via a respective M (an integer) of the antenna elements 106 (N=16 and M=4 in the example shown).

As shown in the example implementation of FIG. 1C, antenna elements 106, of which two elements are shown in the cross-section slice depicted in FIG. 1C, the antenna elements 106 may be formed using carved horn structure 154, which may comprise polycarbonate (or other suitable material) substrate with conductive plating (e.g., aluminum) covering the surfaces forming the horn-shaped antenna elements. The antenna elements 106 may be mounted to a rigid base structure 156 (e.g., made of aluminum). In between the base structure 156 and the horn structure 154 may be one or more printed circuit board (PCB) 152 that provides RF traces interconnecting the circuit assemblies 111 and the antenna elements 106.

Phased array systems, such as the phased array system 100, offer various advantages and/or improvements over conventional antenna systems, such as dish-based designs. In this regard, because of their light weight, small form factor, and use of beam steering (e.g., beamforming), phased array systems are preferable over traditional dish-based designs. The elimination of dish and related components (e.g., the frequency duplexer, large power amplifier ("PA"), etc.) allows for installation at a wider range of sites, with lower cost of installation and operation (e.g., automatic alignment). Accordingly, phased array systems may be installed in a more flexible manner compared to dish-based designs, allowing installation options not possible or practical with traditional designs—e.g., mounting to sides of buildings, etc.

Phased array systems may have lower costs (e.g., fewer, smaller, and less expensive circuits, etc.). Also, the use of software-defined multiband array operation adds more flexibility. For example, the elimination of certain components (e.g., duplexers) allows the array-based systems to operate across a wide frequency range. Greater link reach may be achieved for the same dish size (due to, e.g., greater transmitter power, interference suppression, etc.). Operations may be improved (e.g., lower operating expenditures, greater frequency reuse, lower weight, etc.). Further, phased array systems may have superior thermal dissipation characteristics. In addition, the same core technology may be used for different interfaces and/or frequencies bands, allowing for common software and hardware development.

Figure 2A:
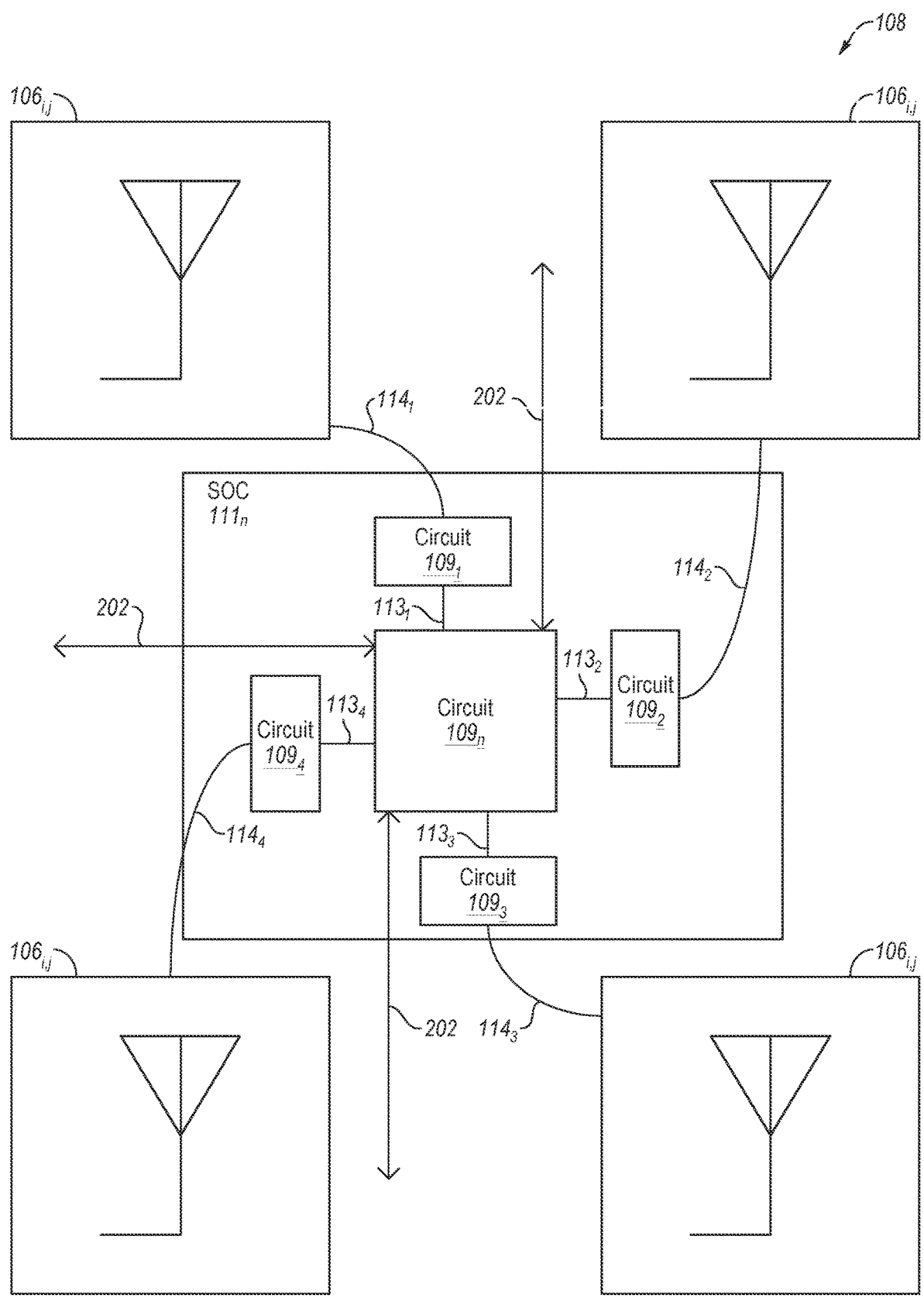
FIGS. 2A and 2B show an architecture of a phased array transceiver system in accordance with an example implementation of this disclosure.
Figure 2B:
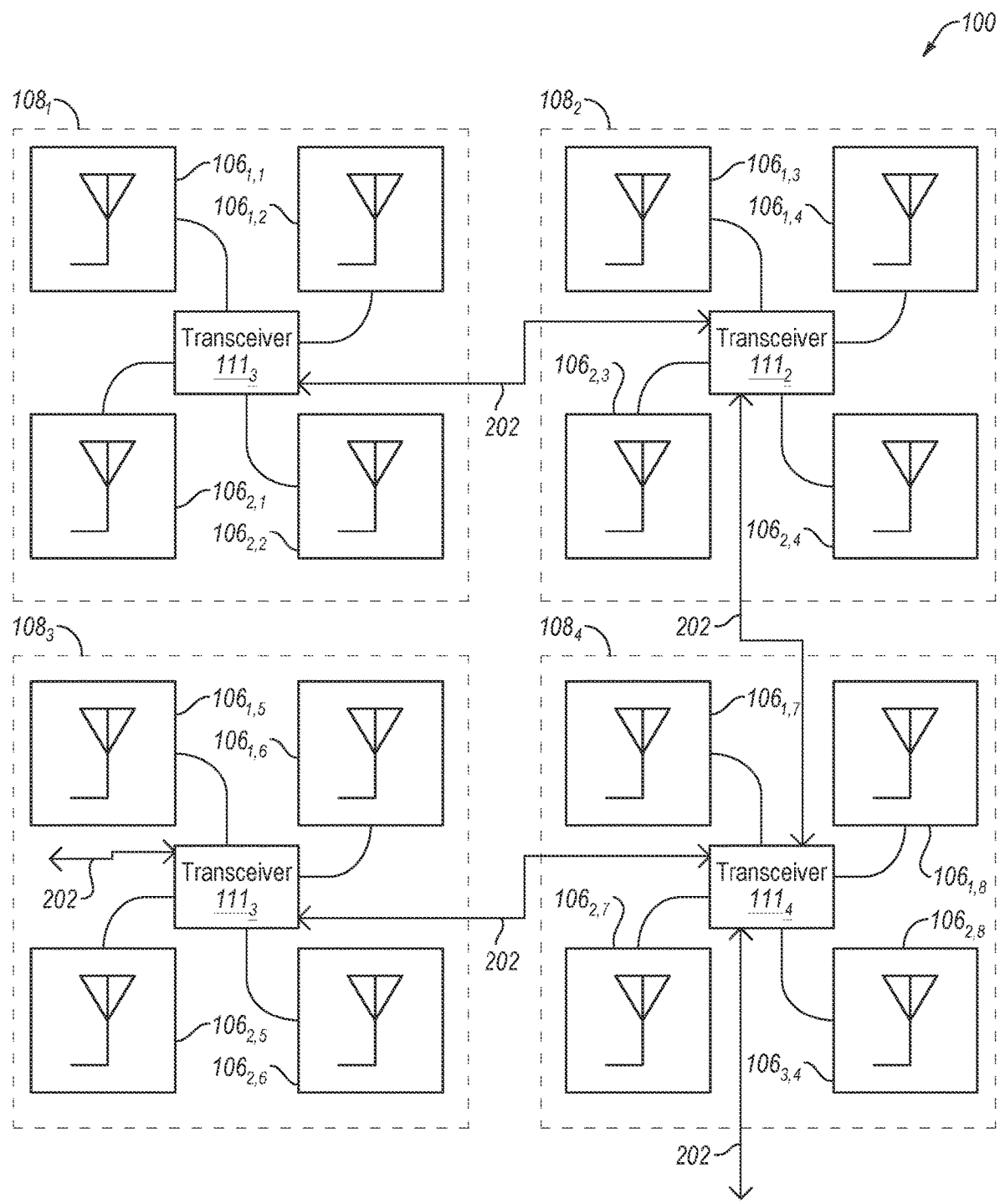

FIGS. 2A and 2B show an example architecture of a phased array transceiver system. In the example implementation of FIGS. 2A and 2B, each circuit assembly $111_n$ comprises a highly-integrated transceiver system on chip $110n$ and a plurality of off-chip circuits $109_m$, each of the circuits $109m$ being associated with a respective one of the M antenna elements $106$ via which the SoC $110n$ transmits and/or receives. An example implementation of the SoC $110_n$ is described below with reference to FIG. 2C. An example implementation of the circuits $109$ is described below with reference to FIG. 2C. The N SoCs $110_1$-$110_N$ are interconnected via interconnect $202$, which may, for example, comprise a high-speed serial bus via which the SoCs $110_1$-$110_N$ can exchange data and control signaling.

In an example implementation, each circuit $111$ is operable to: (1) transmit, in one or more desired directions using beamforming, millimeter wave signals (e.g., in the 76 to 81 GHz band) via its antenna elements $106$; (2) receive reflections of the transmitted signal, from one or more desired directions using beamforming; and (3) process the received reflections to generate a representation of the "scene" on which the signals are incident. For example, the scene representation may be a voxel grid, with each voxel corresponding to a particular location in 4-Dimensional space (e.g., its GPS coordinates and time at which the coordinates were measured). Also, each voxel may have additional information associated with it such as, for example, a strength of the reflection, a spectrum of the reflection, a velocity of an object (e.g., car, pedestrian, etc.) located at the voxel, and/or a material composition (e.g., a quantification of how hard or soft) of an object located at the voxel.

Figure 2C:
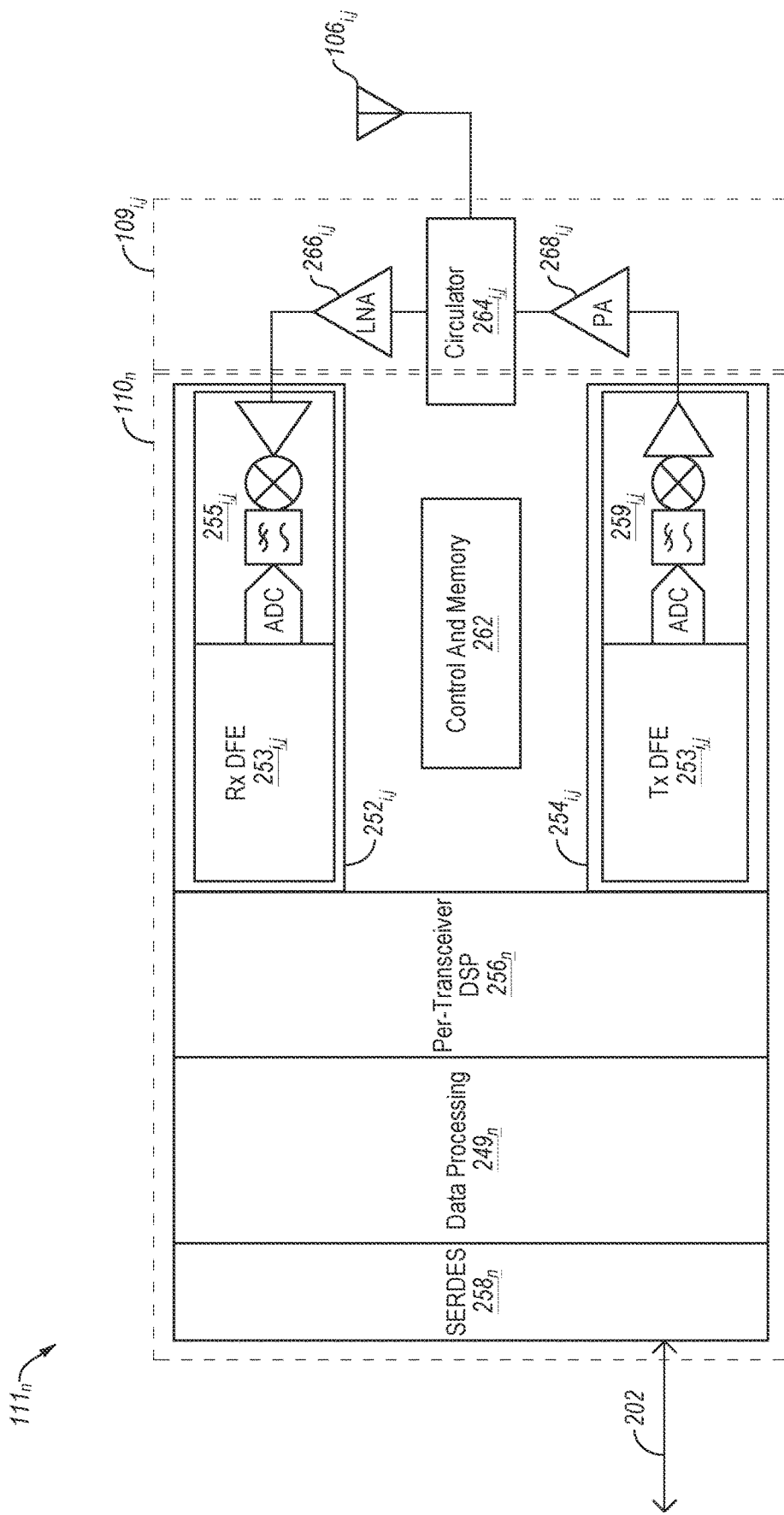
FIG. 2C shows an example implementation of a transceiver system on chip (SoC) suitable for use in a phased array radar system in accordance with an example implementation of this disclosure.

Shown in FIG. 2C are details of an example implementation of the SoC $110_n$ and a circuit $109_{i,j}$. In an example implementation, the SoC $110_n$ is a CMOS device and the LNA $266_{i,j}$ and PA $268_{i,j}$ are PHEMT devices. In other example implementations, one or more components of the circuits $109_{i,j}$ may be integrated on the CMOS chip $110_n$.

The example SoC $110_n$ comprises serialization and deserialization (SERDES) circuitry $258$, per-transceiver digital signal processing (DSP) circuitry $256$, one or more receive front-end circuits $252_{i,j}$, one or more transmit front-end circuits $254_{i,j}$, and a portion of one or more (four, in an example implementation) circulator $264_{i,j}$. Although only one receive front-end circuit $252_{i,j}$ and one transmit front-end circuit $254_{i,j}$ are shown for simplicity of illustration, the SoC $110_n$ may comprise any number of instances of these circuits. In the example implementations of FIGS. 1A, 1B, 2A, and 2B, for example, the SoC $110_n$ may comprise four instances of receive front-end circuit $252_{i,j}$—one for each of the four antenna elements $106_{i,j}$ via which the SoC $110_n$ receives, and four instances of transmit front-end circuit $254_{i,j}$—one for each of the four antenna elements $106_{i,j}$ via which the SoC $110_n$ transmits.

The example circuit $109_{i,j}$ comprises a low-noise amplifier $266_{i,j}$, a power amplifier $268_{i,j}$, and a portion of the circulator $264_{i,j}$. Although only one circuit $109_{i,j}$ is shown for simplicity of illustration, the circuit assembly $111_n$ may comprise any number of instances of this circuits. In the example implementations of FIGS. 1A, 1B, 2A, and 2B, for example, the circuit assembly $111_n$ may comprise four instances—one for each antenna $106_{i,j}$ via which the SoC $110n$ transmits and/or receives.

Each of the receive front-end circuits $252_{i,j}$ comprises an analog front-end circuitry (AFE) $255_{i,j}$ and a digital front-end circuit (DFE) $253_{i,j}$ operable to process a millimeter wave signal (e.g., in the band from 76 to 81 GHz) from antenna elements $106_{i,j}$.

The processing by AFE $255_{i,j}$ may comprise, for example, low noise amplification, down-conversion, filtering, and analog-to-digital conversion by the AFE $255_{i,j}$ so as to output a intermediate frequency or digital baseband signal to the DFE $253_{i,j}$. For example, each Rx AFE $255_{i,j}$ may downconvert a received 76 to 77 GHz band to a 1-GHz-wide baseband signal which the corresponding ADC $254$ may then digitize to generate a 1-GHz-wide digital signal. As another example, each Rx AFE $255_{i,j}$ may downconvert a received 76 to 81 GHz band to a 5 GHz wide baseband signal which the corresponding ADC $254$ may then digitize to generate a 5-GHz-wide digital signal.

The processing by DFE $253_{i,j}$, may comprise, for example, channel estimation and equalization.

For received signals, the DSP circuit $256_n$ is operable to process the digitized signals from the plurality of DFEs $253_{i,j}$ to recover information conveyed by the received signals. Such information may be conveyed by characteristics (e.g., latency, Doppler shift, signal strength, etc.) of the received signals, as is the case in a conventional radar system, and/or may be data that was modulated onto the received signals. In an example implementation in which the millimeter wave signals are modulated by a data signal, the processing performed by the digital signal processing circuit $256_n$ may include demodulation. For example, the millimeter wave signals transmitted by transceivers $111$ may comprise OFDM frames and each digital signal processing circuit $256_n$ may be operable to demodulate the received signals using a discrete Fourier transform. The digital signal processing circuit $256_n$ may then be operable to demap the modulated signal according to one or more symbol constellations, deinterleave the demapped bits, and decode the demapped bits. The recovered bits may then be provided to the control and memory subsystem $262$ and/or to SERDES $258_{i,j}$ for output onto the bus $202$.

Received signal processing by DSP $256_n$ may comprise, for example, applying a determined phase shift to the signals received from each DFE $253_{i,j}$ and then combining the signals so as to achieve the desired beamforming. The beamforming may comprise time-domain beamforming in which one or more sets of phase and amplitude coefficients is applied to each of the signals $255$ in the time domain. Alternatively, or additionally, the beamforming may comprise frequency-domain beamforming in which the signals $255$ are first transformed to the frequency domain (e.g., via a DFT) and then each subband (e.g., each OFDM bin or group of OFDM bins) is processed using a corresponding one or more beamforming matrices determined for that subband. In this manner, different subbands may be communicated on beams pointed in different directions.

Received signal processing performed by the digital signal processing circuit $256_n$ may comprise spectral analysis of the received signals. The spectral analysis may comprise, for example, mixing received signals with one or more reference signals to generate a difference signal. The spectral analysis may comprise, for example, performing a discrete Fourier transform on received signals. The spectral analysis may be used to, for example, determine Doppler shift of received signals and/or to generate spectral signatures of detected objects in the scene (i.e., objects off of which the received signals reflected).

Received signal processing performed by the digital signal processing circuit 256 may comprise separating different signals (e.g., originating from different ones of the transceivers $111_1$-$111_N$). The may comprise, for example, correlating the received signals with different orthogonal codes and/or pseudorandom sequences used by different ones of the SoCs $111_1$-$111_N$. Alternatively, or additionally, separating different transmitted signals (e.g., to determine which transceiver $111_n$ sent which signal) may comprise directly recovering a respective identifier (e.g., a unique identifier such as a MAC address or similar) modulated onto each of the millimeter wave signals. The ability to distinguish which, if any, energy arrived from each SoCs $111_1$-$111_N$ may be useful for performing radar, positioning, and communication functions. For the radar and positioning functions, for example, the identification of which of transceivers $111_1$-$111_N$ sent any particular received signal may be used for determining the position and angle from which the signal was transmitted (since the different transceivers $111_1$-$111_8$ are at different positions in the array 100), which may be used for determining precise distance to, and location of, objects in the scene. For the communication function, for example, the identification of which of transceivers $111_1$-$111_N$ sent any particular received signal may be used in a manner similar to a "from" address in many networking protocols.

The data processing circuitry $249_n$ is operable to process data output by the digital signal processing circuitry $256_n$. Such processing may comprise, for example, implementing algorithms to generate a representation of the scene detected using the radar function. Based on the angle, strength, timing, spectral content, and/or other characteristics of the received signals, the data processing circuitry $249_n$ may generate a 2D pixel grid or 3D voxel grid. In an example implementation, each pixel or voxel may indicate an absolute position to which it corresponds, the strength of returns, if any, received from that location, spectral content of returns, if any, received from that location, time(s) at which returns were received from that location, and/or at which the pixel or voxel data was updated.

The data processing circuitry $249_n$ may also be operable to process data received from the data bus 202. For example, positioning information may be received via the bus 202 (e.g., GPS coordinates from a GPS receiver) and combined with data recovered from the data processing circuitry $249_n$ for performing a positioning function.

The processing performed by data processing circuitry $249_n$ of data output by digital signal processing circuitry 256 may comprise, for example, preparing data for output onto the data bus 202. For example, a scene representation generated from the output of the digital signal processing circuitry 256 may be transmitted onto the data bus 202.

Each of the Tx AFEs $259_{i,j}$ is operable to receive a digital baseband signal from Tx DFE $257_{i,j}$, convert the signal to analog, upconvert the signal to a millimeter wave (e.g., a 1 GHz to 5 GHz wide signal in the band from 76 to 81 GHz), and amplify the millimeter wave signal for output to antenna element $106_{i,j}$.

For transmit, the digital signal processing circuitry $256_n$ is operable to process one or more data streams from data processing circuitry $249_n$ to generate a plurality (four in the example shown) of digital baseband signals. Transmit processing performed by digital signal processing circuitry $256_n$ may comprise, for example, encoding, interleaving, bit-to-symbol mapping, frequency mapping (mapping of symbols to subbands), modulation (e.g., using discrete Fourier transform and/or inverse discrete Fourier transform) beamforming, and/or the like.

The transmit processing performed by the digital signal processing circuit $256_n$ may comprise generating modulated signals to be modulated onto one or more carriers. For example, the digital signal processing circuit $256_n$ may output an OFDM signal.

The transmit processing performed by the digital signal processing circuit $256_n$ may comprise beamforming. The beamforming may comprise time-domain beamforming and/or frequency-domain beamforming.

Transmit operations performed by the data processing circuit $249_n$ may comprise generating one or more data signals for modulation onto the millimeter wave signals transmitted by the circuit assembly $111_n$. The datastreams may, for example, be read from memory of the circuit assembly $111_n$ (e.g., an identifier of the module $111_n$) and/or generated algorithmically (e.g., timestamps generated based on a clock of the control portion of subsystem 262). Additionally, or alternatively, the data may be received from bus 202 via bus controller $258_n$. The data processing circuit $249_n$ may packetize and/or otherwise format the data.

The bus controller circuitry $258_n$ is operable to relay data between the data bus 202 and the circuitry of the SoC $110_n$. The bus 202 may, for example, be a high speed serial bus in which case the bus controller circuitry $258_n$ is operable to perform serialization and deserialization for communicating over the bus 202.

The control portion of subsystem 262 is operable to manage operations of the circuit assembly $111_n$ (e.g., implement a state machine and/or other control logic that controls the configuration of the other components of the receive circuit assembly $111_n$). The control portion of subsystem 262 may, for example, configure beamforming matrices used by the digital signal processing circuitry $256_n$. For example, the control portion of subsystem 262 may determine that particular directions are of interest at a given time and may configure the beamforming to point beams in those particular directions. Particular directions may be of interest because, for example, it is desired to determine more information about objects located in that direction and/or to listen for communications that are expected to come from that direction. Directions of interest may be determined based on, for example, data received via the data bus 202, data carried in previously received millimeter wave signals, and/or scene representations generated from previously received signal reflections.

The memory portion of subsystem 262 is operable to store relatively large amounts (e.g., hundreds of megabits) of information of a variety of forms. For example, beamforming matrices, an identifier of the transceiver $111_n$, scrambling codes, and messages received from and/or to be communicated to (via data bus 202 and/or via millimeter wave signals) other transceivers $111_n$ are just some examples of the information which may be stored in the memory and readily accessible to the circuit assembly $111_n$.

Figure 3:
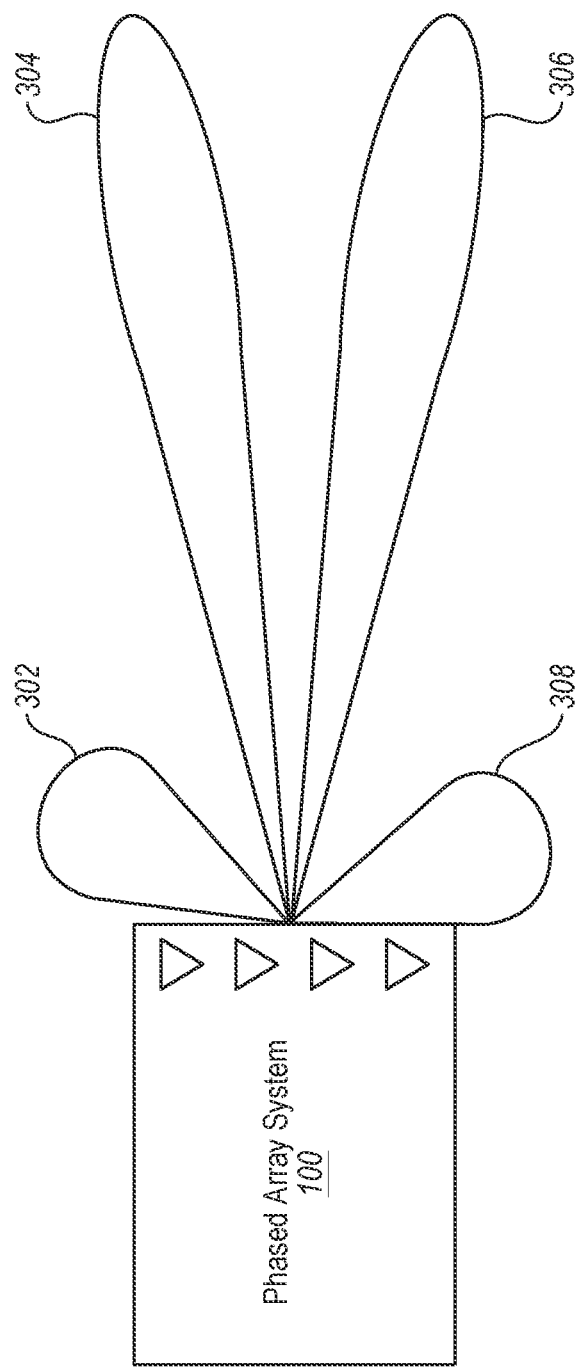
FIG. 3 shows an example antenna pattern of phased array radar system in accordance with an example implementation of this disclosure.

FIG. 3 shows an example antenna pattern of phased array radar system. In the example shown, for desired lobes—302, 304, 306, and 308 are formed. For example, lobes 302 and 308 may be used for identifying objects that are relatively close and off to the side of the phased array system 100, and the lobes 304 and 306 may be used for looking further in the distance (e.g., in the direction of travel of automobile to which the phased array is mounted). As another example, the lobes 302 and 308 may receive returns from the nearby road surface and the Doppler of such returns may be used for calculating the speed of the phased array (i.e., of the automobile to which it is mounted). As another example, lobes 302 and 308 may be used for directly communicating with another phased array system 100 off to the side of the depicted phased array system 100 (e.g., where multiple phased arrays system 100 are mounted to a single vehicle), and lobes 304 and 306 may be used for communicating with other transceivers by bouncing the signals off of objects in the scene.

Although four beams/lobes are shown for illustration, the phased array radar system is not limited to any particular number of beams/lobes. There may be different numbers of beams at different times based on, for example, the number of objects and/or angles of objects it is determined necessary or desirable to identify or track at any given time. There may be different numbers of beams at different times based on, for example, number and/or location of other transceivers with which it is necessary or desirable to communicate at any given time. Similarly, the directions of the beams may vary over time. For example, the directionality of any one or more of the beams 302, 304, 306, and 308 may change periodically, based on what is detected in the scene, based on desired communication to be sent or received, and/or the like.

Figure 4A:
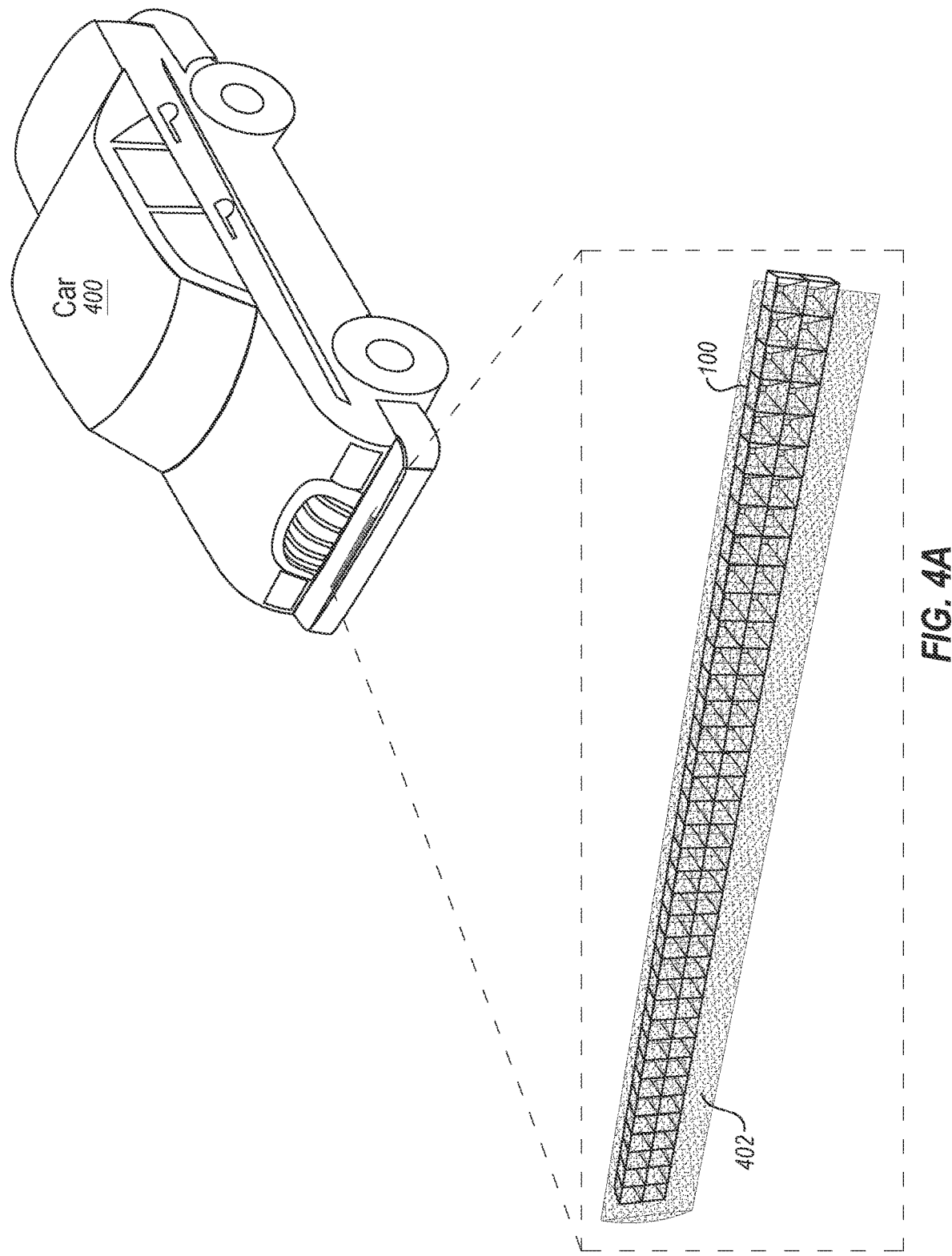
FIG. 4A shows an example phased array radar system integrated into an automobile in accordance with an example implementation of this disclosure.

FIG. 4A shows an example phased array radar system integrated into an automobile. A 2×64 element antenna array is placed in/behind the bumper of the automobile 400. In the example implementation the array comprises a lens 402 that further controls the directionality of the antenna.

Figure 4B:
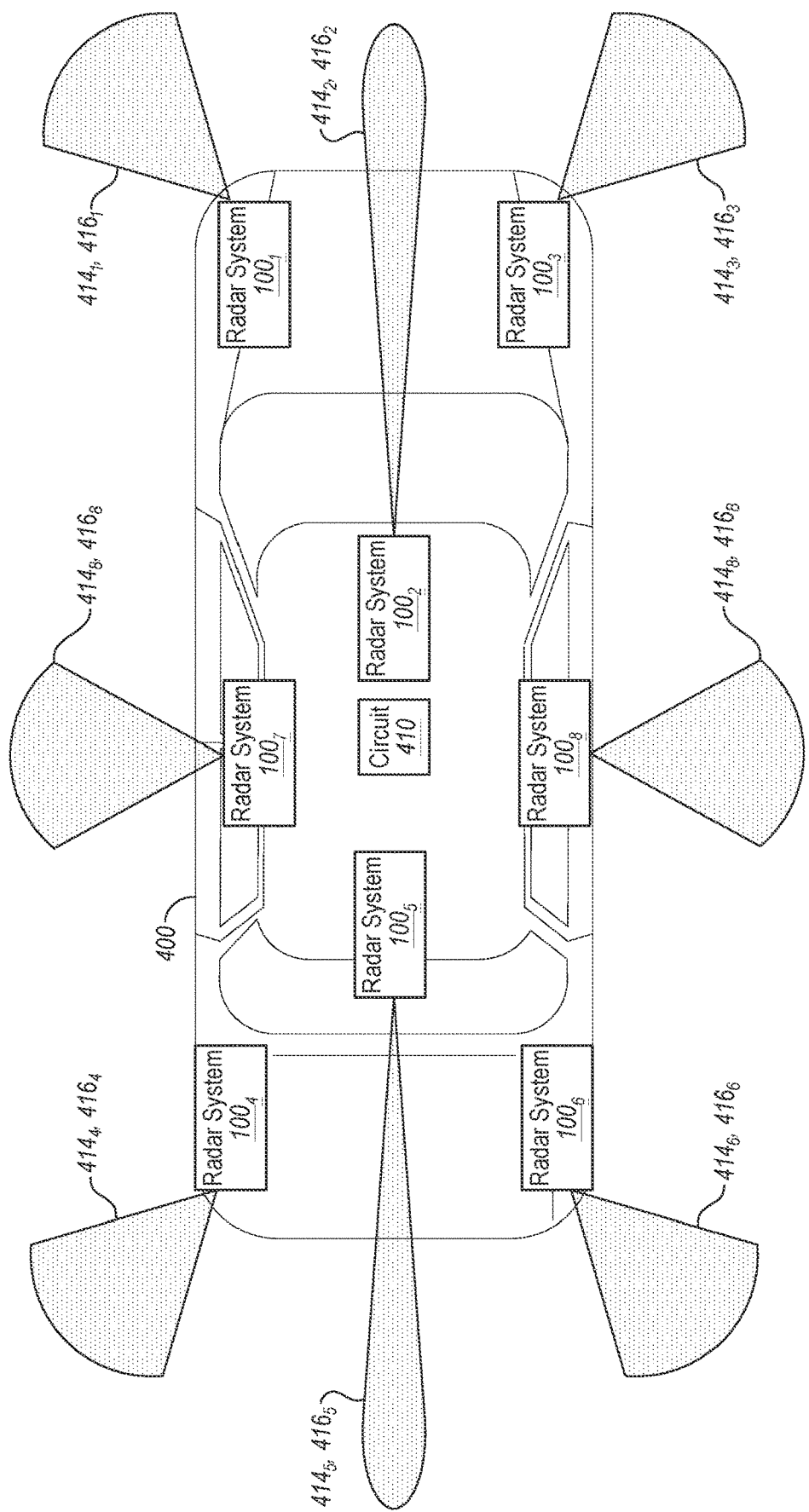
FIG. 4B shows an automobile comprising a plurality of phased array radar systems in accordance with an example implementation of this disclosure.

FIG. 4B shows an automobile 400 comprising a plurality of phased array radar systems 100 (labeled with subscripts '1' through '8'). Although the example automobile 400 comprises eight phased array radar systems 100 for illustration, any number may be present. Each phased array radar system 100 has a corresponding receive antenna pattern 414 and transmit antenna pattern 416 (for clarity of illustration, the transmit and receive patterns are shown as the same, but they need not be). Each phased array radar system 100 may perform: (1) a radar function, (2) a positioning function, and (3) a communication function.

The radar function comprises transmitting millimeter wave signals and processing the reflections/returns of such signals to detect the presence of, identity of, direction of, distance to, and/or speed of objects in the environment surrounding the automobile 400 (the "scene").

The positioning function comprises use of the same millimeter wave signals used for the radar function to improve upon coarse position determined through other mechanisms such as GPS.

The communication function comprises communicating data among the phased array radar systems 100 using the same millimeter wave signals as are used for the radar function. Such data may include, for example, pixel or voxel data (and time and position metadata) generated using the radar and positioning functions.

Through a combination of the radar function, the positioning function, and the communication function, the phased array radar systems 100 are operable to generate a scene representation (e.g., 2D pixel grid or 3D voxel grid) where the absolute time of capture of the scene representation and the absolute position of the pixels (2D) or voxels (3D) in the scene representation are known.

The circuitry 410 represents other circuitry of the automobile 400 such as one or more transceivers (e.g., cellular, Wi-Fi, Bluetooth, GPS, etc.), instrumentation (e.g., entertainment system, driver indicators/gauges, driver controls), sensors for safety systems, etc. The circuitry 410 may be communicatively coupled to the phased array radar systems 100 via a CANbus, for example. The circuitry 410 may be operable to process data from the phased array systems $100_1$-$100_8$ and take action (e.g., trigger driver alerts, transmit messages via one or more of its transceivers, trigger braking or other safety systems, etc.) in response to such data. The circuitry 410 may also generate data which it may pass to the phased array systems $100_1$-$100_8$ for communication to a remote phased array radar system 100 (e.g., that is mounted to another automobile and/or to infrastructure such the road, sign post, stop-light, etc.) In an example implementation, the circuitry 410 may comprise a cell phone that connects to an electronics system of the automobile 400 via USB, Bluetooth, Wi-Fi, or any other suitable interface and then the circuitry 410 of the automobile 400 leverages the cellular transceiver of the circuitry 410 for connecting to a cellular network.

Figure 4C:
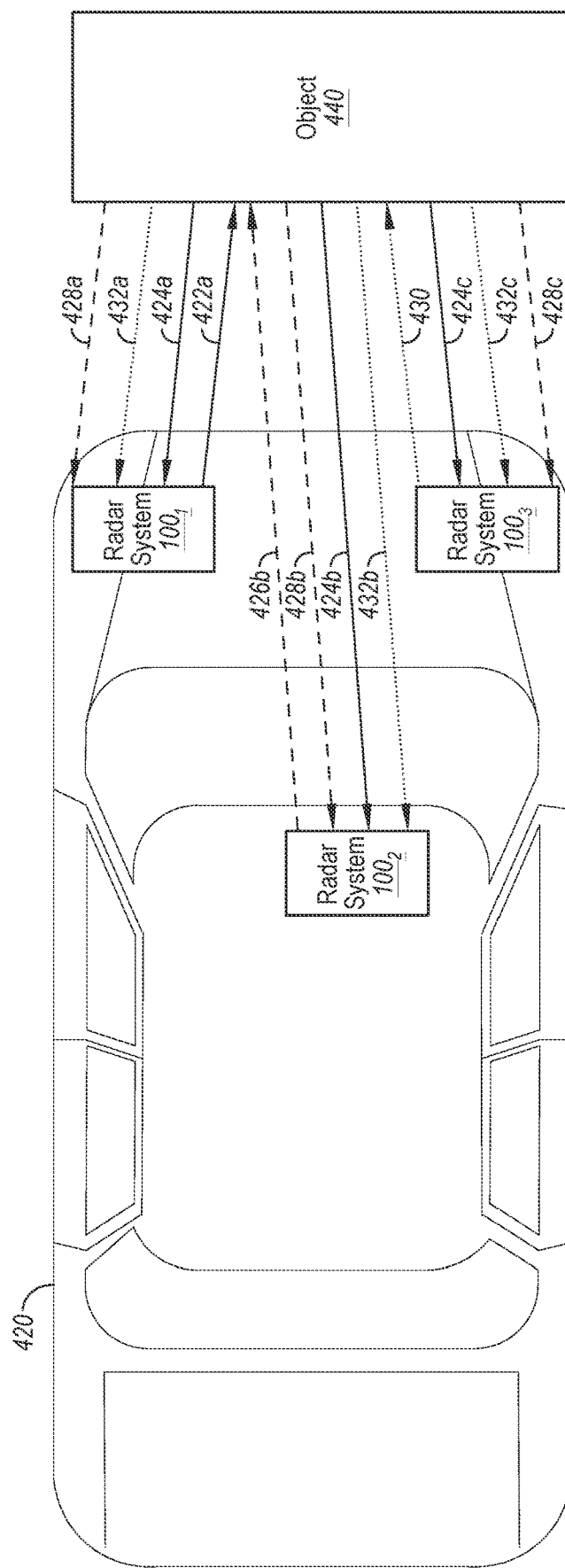
FIG. 4C shows example operation of a phased array radar system in accordance with an example implementation of this disclosure.

FIG. 4C shows example operation of a phased array radar system. The radar system $100_1$ transmits millimeter wave signal 422 which reflects off of object 440 (e.g., the car in front of the automobile 400) and is then received as signal 424a by radar system $100_1$, signal 424b by radar system $100_2$, and signal 424c by radar system $100_3$. The radar system $100_2$ transmits millimeter wave signal 426 which reflects off of object 440 and is then received as signal 428a by radar system $100_1$, as signal 428b by transceiver $100_2$, and as signal 428c by radar system $100_3$. The radar system $100_3$ transmits signal 430 which reflects off of object 440 and is then received as signal 432a by radar system $100_1$, as signal 432b by radar system $100_2$, and as signal 432c by radar system $100_3$.

As discussed above, each of the radar systems $100_1$, $100_2$, and $100_3$ may be operable to separate its respective received signals. That is, radar system $100_1$ can distinguish between energy of signal 424a, energy of signal 428a, and energy of signal 432a. Similar can be said for each of radar systems $100_2$ and $100_3$. This separation may be possible because, for example, the signals 422, 426, and 430 are frequency division multiplexed, time division multiplexed, spatially multiplexed, and/or code division multiplexed. Coordination for carrying out such multiplexing may be achieved as a result of, for example: factory settings of the three radar systems $100_1$, $100_2$, and $100_3$; passing control/coordination information among the radar systems $100_1$, $100_2$, and $100_3$ via the data bus 202; passing control/coordination information among the radar systems $100_1$, $100_2$, and $100_3$ via the millimeter wave signals 422, 426, 430, and/or the like.

FIG. 5A shows an example OFDM frame transmitted by a phased array radar system in accordance with an example implementation of this disclosure. For any given burst (frame), a phased array radar system in accordance with this disclosure may transmit on one or more of a plurality of subbands 504 (twenty-four subbands were chosen arbitrarily for illustration, any number may be used). On each of the subbands $504_1$-$504_{24}$ may be a continuous wave or a modulated data signal (e.g., a N-QAM symbol corresponding to $\log_2(N)$ bits of the data signal). Different subbands and/or groups of subbands may be allocated for different purposes (e.g., some for radar, some for positioning, and some for communication). Similarly, using frequency-domain beamforming, signals on different subbands and/or groups of subbands may be pointed in different directions for detecting objects at different locations in the scene and/or for transmitting the data signal in different directions (e.g., pointed at different reflection paths leading to different ones of the transceivers $111_1$-$111_8$).

Data modulated onto the millimeter wave signal may be forward error correction encoded for robustness. Data modulated onto the millimeter wave signal may be scrambled or encrypted for security (e.g., to prevent spoofing, sniffing of communications, etc.).

Figure 5B:
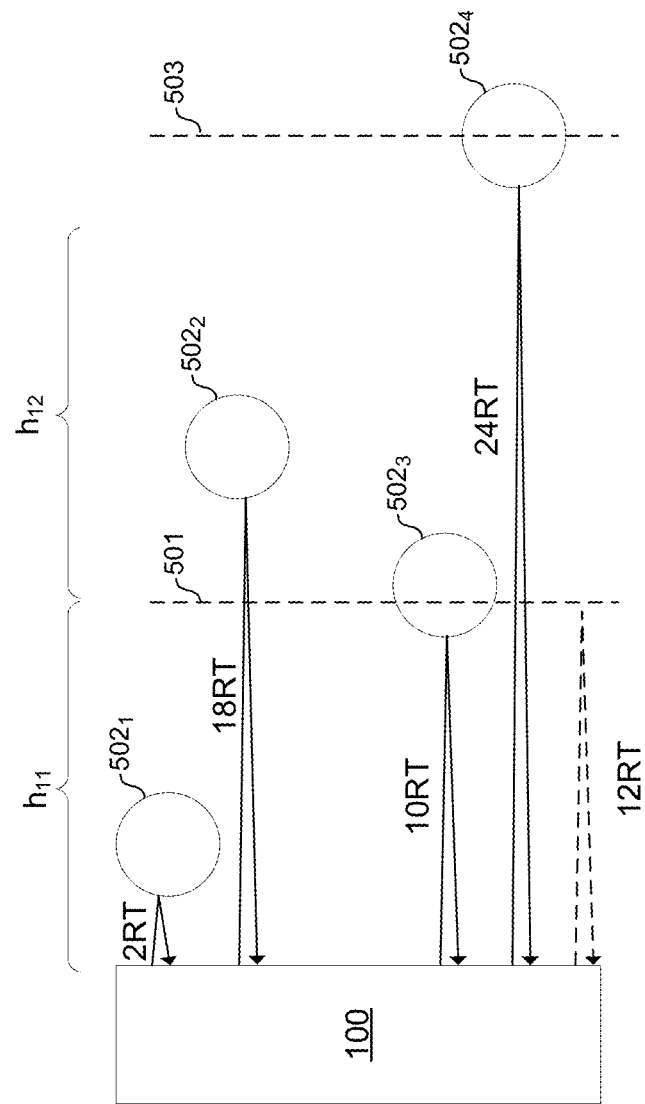
FIG. 5B shows an example scene in which a phased array radar system operates.

FIG. 5B shows an example scene in which a phased array radar system operates. The scene is at a direction D1 relative to the phased array radar system 100 and comprises four objects $502_1$-$502_4$ (each of which may be an automobile, a pedestrian, debris, or any other object on a roadway, for example). For simplicity of illustration, the distances between the phased array radar system 100 and the object $502_1$-$502_4$ has been normalized to multiples of 1 roundtrip time ("RT"). The scene is also split at a distance corresponding to 12RT, as will be discussed further below. The channel response of the scene in direction D1 at distances from 0 to 12RT is denoted $h_{12}$, The channel response of the scene in direction D1 at distances from 12RT to 24RT is denoted $h_{12}$. The number of objects and the distances to the objects have been chosen arbitrarily for illustration. The number of ranges into which the scene is split (two in the example), and the length of each range have been chosen arbitrarily for illustration. In other embodiments the scene may be split into fewer or more ranges and the lengths of the ranges may be equal (as shown) or unequal.

FIG. 5C shows the channel response of the scene of FIG. 5B.

Figure 5D:
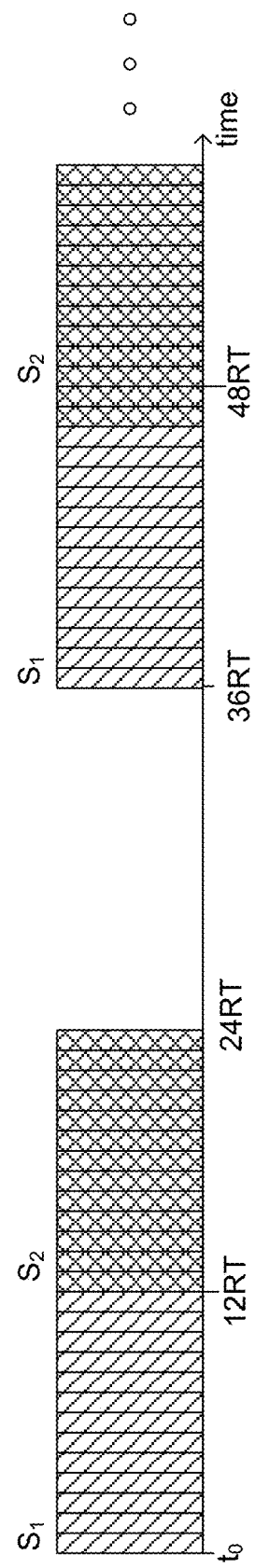
FIG. 5D shows an example signal structure for a phased array radar system in accordance with an example implementation of this disclosure.

FIG. 5D shows an example signal structure for detecting the scene of FIG. 5B. The transmit signal is split into four intervals, which is equal to two times the number of ranges into which the scene has been split. In other implementations, the ratio of signal intervals to number of scene ranges may be greater or less than two. In an example implementation, the duration of the interval of the signal is determined based on the lengths of the ranges of the scene. In the example implementation shown, the first and third intervals are equal to the duration of the first range of the scene (12RT), and the second and fourth intervals are equal to the duration of the second range of the scene (also 12RT in the example shown). The selection of signal intervals in this manner enables generating estimates of $h_{11}$ and $h_{12}$ and iteratively improving those estimates, as further described below with reference to FIG. 5F.

In the example shown, a first OFDM symbol, $S_1$, is repeatedly transmitted during the first interval, a second OFDM symbol, $S_2$, is repeatedly transmitted during the second interval, and then the transmitter is silent during the third interval. This signaling enables generating estimates of $h_{11}$ and $h_{12}$ and iteratively improving those estimates, as further described below with reference to FIG. 5F.

FIG. 5E illustrates the radar returns of the signal of FIG. 5D transmitted into the scene of FIG. 5B. As shown, reflections of $S_1$ from object $502_1$ arrive from 2RT to 14RT; reflections of $S_1$ from object $502_3$ arrive from time 10RT to time 22RT; reflections of $S_1$ from object $502_2$ arrive from time 18RT to time 30RT; reflections of $S_1$ from object $502_4$ arrive from time 24RT to time 36RT; reflections of $S_2$ off of object $302_1$ arrive from time 14RT to time 26RT; reflections of $S_2$ off of object $502_3$ arrive from time 22RT to time 34RT; reflections of $S_2$ off of object $502_2$ arrive from time 30RT to time 42RT; and reflections of $S_2$ off of object $503_4$ arrive from time 36RT to time 48RT.

Figure 5F:
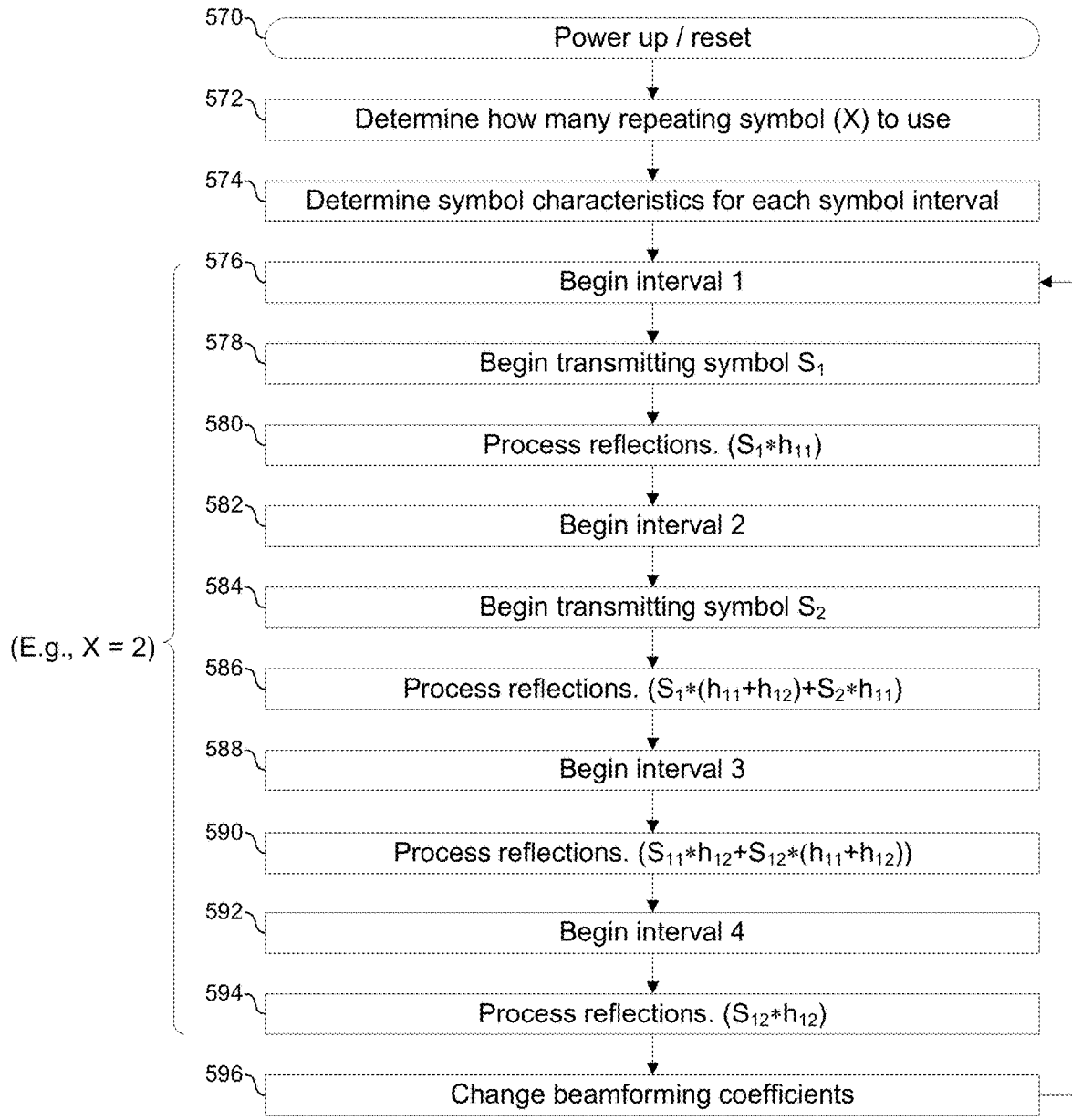
FIG. 5F is a flowchart illustrating operation of a phased array radar system in accordance with an example implementation of this disclosure.

FIG. 5F is a flowchart illustrating operation of a phased array radar system in accordance with an example implementation of this disclosure.

In block 570, a phase array radar system 100 is powered up and/or reset.

In block 572, the radar system 100 determines how many (denoted by integer X) repeating symbols to transmit for scene detection. The system may determine the value of X based on, for example: the speed at which the radar system 100 is moving (e.g., where it is mounted in a vehicle); scene representations generated in a previous time interval (e.g., the system 100 may use more or fewer symbols based on number, proximity, speed, type, and/or other characteristics of objects detected in the scene during the previous time interval). In the example implementations described in with respect to FIGS. 5B-5F, two repeating symbols are used (i.e., X=2).

In block 572, phased array radar system 100 determines characteristics of each of the repeating symbols to be transmitted. Such characteristics may include, for example, number of subcarriers in each of the OFDM symbols, spacing of the subcarriers of each of the OFDM symbols, bandwidth of each the OFDM symbols, symbol constellation used to modulate the subcarriers of the OFDM symbol, transmit power of the OFDM symbol, and/or the like. Uniform characteristics may be chosen for each of the repeating symbols, or different characteristics may be used for different ones of the repeating symbols. In an example implementation, different characteristics may be used for different transmissions of the same symbol (e.g., symbol $S_1$ may have first characteristics when it is transmitted at time to and may have second characteristics when transmitted at time $t_4$).

In block 576, time interval 1 (corresponding to, for example, the interval from $t_0$ to 12RT in FIGS. 5C-5E) begins.

In block 578, phased array radar system 100 begins transmitting the first repeating symbol, denoted $S_1$.

In block 580, phased array radar system 100 receives and processes reflections of $S_1$ from the portion of the scene corresponding to $h_{11}$. Thus, the reflections during time interval 1 are equal to the convolution of $S_1$ with the channel response $h_{11}$ (i.e., $S_1 * h_{11}$). Thus, since $S_1$ is known, the receiver can process the reflections to generate an estimate of $h_{11}$.

In block 582, time interval 2 (corresponding to, for example, the interval from 12RT to 24RT in FIGS. 5C-5E) begins.

In block 584, the phased array radar system 100 begins transmitting the second of the repeating symbols, denoted $S_2$ (transmission of $S_1$ ceased prior to time interval 2).

In block 586, phased array radar system 100 receives and processes reflections. During time interval 2, the reflections correspond to reflections of $S_1$ from the portions of the scene corresponding to $h_{11}$ and $h_{12}$, and reflections of $S_2$ from portions of the scene corresponding to $h_{11}$. Thus, the reflections during time interval 2 can be represented as $S_1*(h_{11}+h_{12})_+S_2*h_{11}$. Thus, the receiver can use the known symbols $S_1$ and $S_2$, along with the previously-generated estimate of $h_{11}$, to improve the estimate of $h_{11}$ as well as generate an initial estimate of $h_{12}$.

In block 588, time interval 3 (corresponding to, for example, the interval from 24RT to 36RT in FIGS. 5C-5E) begins, and the phased array radar system 100 ceases transmitting symbols.

In block 590, phased array radar system 100 receives and processes reflections. During time interval 3, the reflections correspond to reflections of $S_1$ from the portions of the scene corresponding to $h_{12}$, and reflections of $S_2$ from portions of the scene corresponding to $h_{11}$ and $h_{12}$. Thus, the reflections during time interval 3 can be represented as $S_1*h_{12}+S_2*(h_{11}+h_{12})$. Thus, the receiver can use the known symbols $S_1$ and $S_2$, along with the estimates of $h_{11}$ and $h_{12}$, to improve the estimates of $h_{11}$ and $h_{12}$.

In block 592, time interval 4 (corresponding to, for example, the interval from 36RT to 48RT in FIGS. 5C-5E) begins.

In block 594, phased array radar system 100 receives and processes reflections. During time interval 4, the reflections correspond to reflections of $S_2$ from the portions of the scene corresponding to $h_{12}$. Thus, the reflections during time interval 4 can be represented as $S_2*h_{12}$. Thus, the receiver can use the known symbol $S_2$, along with the previous estimate of $h_{11}$ and $h_{12}$, to improve the estimates of $h_{11}$ and $h_{12}$.

In block 596, the phased array system 100 changes the beamforming coefficients to change the direction at which it transmits and/or receives and then the process of transmitting the repeating symbols repeats by returning to block 576. In this manner, each cycle through time intervals 1 through 4 may correspond to determining the scene in a particular direction. That is, the phased array radar system 100 may sweep through a range of Y (an integer) angles in Y cycles of time intervals 1 through 4. The Y scene representations generated corresponding to the Y angles may then be combined to generate a single overall scene representation. Each of the N transceivers $111_n$ may generate such a scene representation and then convey its scene representation to one of the N transceivers designated as an aggregating node. The aggregating Node then combines the N scene representations and conveys it to the host system (e.g., computing system 410 of an automobile 400 to which the phased array radar system 100 is mounted).

Figure 6A:
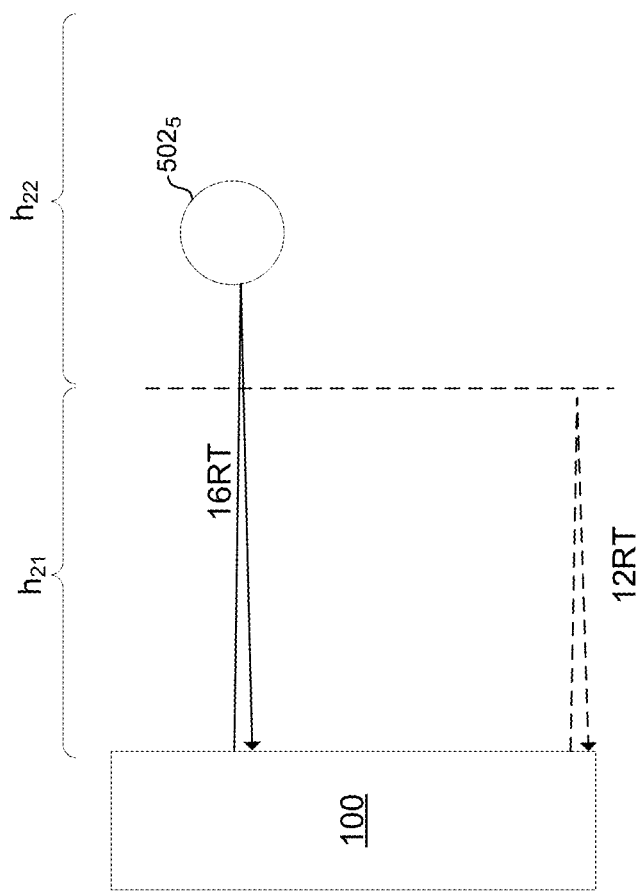
FIG. 6A shows a second direction of the example scene of FIG. 5B.

FIG. 6A shows a second direction of the example scene of FIG. 5B. The scene is at a direction D2 relative to the phased array radar system 100 (e.g., D1 in FIG. 5B may be on boresight (0°) and D2 of FIG. 5B may be 40° off boresight). In direction D2 there is a single object $502_5$ at a distance of 16RT. The channel response of the scene in direction D2 at distances from 0 to 12RT is denoted $h_{21}$. The channel response of the scene in direction D2 at distances from 12RT to 24RT is denoted $h_{22}$. The number of objects and the distances to the objects have been chosen arbitrarily for illustration. The number of ranges into which the scene is split (two in the example), and the length of each range have been chosen arbitrarily for illustration. In other embodiments the scene may be split into fewer or more ranges and the lengths of the ranges may be equal (as shown) or unequal.

Figure 6B:
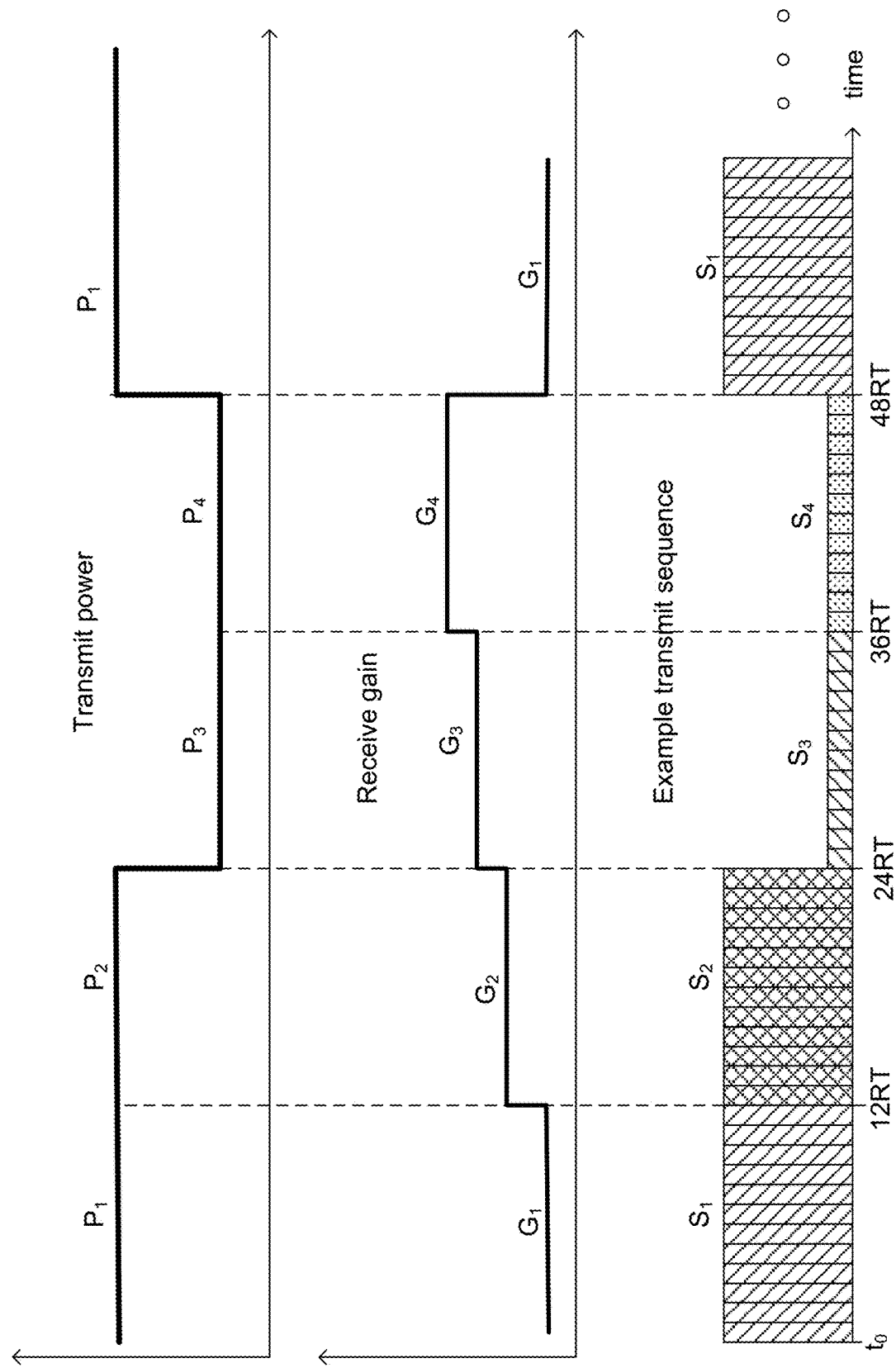
FIG. 6B shows an example signal structure and corresponding transmit power and receive gain for a phased array radar system in accordance with an example implementation of this disclosure.

FIG. 6B shows an example signal structure and corresponding transmit power and receive gain for a phased array radar system in accordance with an example implementation of this disclosure. The transmit signal is split into four intervals. In an example implementation, the durations of the intervals are determined based on the lengths of the ranges of the scene. In the example implementation shown, the first and third intervals are equal to the duration of the first range of the scene, and the second and fourth intervals are equal to the duration of the second range of the scene. The selection of signal intervals in this manner enables generating estimates of $h_{21}$ and $h_{22}$ and iteratively improving those estimates, as further described below with reference to FIG. 6D.

In the example shown, a first OFDM symbol, $S_1$, is repeatedly transmitted during the first interval at a first transmit power, $P_1$; a second OFDM symbol, $S_2$, is repeatedly transmitted during the second interval at a second transmit power, $P_2$; a third OFDM symbol, $S_3$, is repeatedly transmitted during the third interval at transmit power $P_3$, and a fourth OFDM symbol, $S_4$, is repeatedly transmitted during the fourth interval at transmit power $P_4$. In the example implementation shown, $P_1=P_2$, $P_3=P_4$, and $P_3<P_1$. The lower transmit power used during intervals 3 and 4 prevents the transmitter of the phased array antenna 100 from critically desensitizing the receiver of the phased array antenna 100 during intervals 3 and 4 when relatively weak reflections of $S_1$ and $S_2$ from $h_{12}$ and $h_{22}$ are being received. In another example implementation, P1>P2>P3>P4. In still other implementations, other relative power levels may be used.

In addition to, or instead of, transmitting symbols $S_3$ and $S_4$ at lower transmit power than symbols $S_1$ and $S_2$, the phased array radar system 100 may transmit $S_3$ and $S_4$ in direction D2, whereas symbols $S_1$ and $S_2$ are transmitted in direction D1. The transmission of $S_3$ and $S_4$ in $D_2$—while $S_1$ and $S_2$ where transmitted and are returning from D1—reduces the interference between $S_3$ and $S_4$ and the reflections of $S_1$ and $S_2$ being received during intervals 3 and 4.

In the example implementation of FIG. 6B, receiver gain is also adjusted based on the interval in which the phased array radar system is operating. The receive gain is set to $G_1$, $G_2$, $G_3$, $G_4$ during intervals 1, 2, 3, and 4, respectively. In the example implementation, $G_1<G_2<G_3<G_4$ such that the gain is increased as weaker reflections—from farther away objects and/or from symbols transmitted at lower transmit power—arrive at the phased array radar system 100.

The signaling scheme of FIG. 6B enables generating estimates of $h_{11}$, $h_{12}$, $h_{21}$, and $h_{22}$ and iteratively improving those estimates, as further described below with reference to FIG. 5F.

Figure 6C:
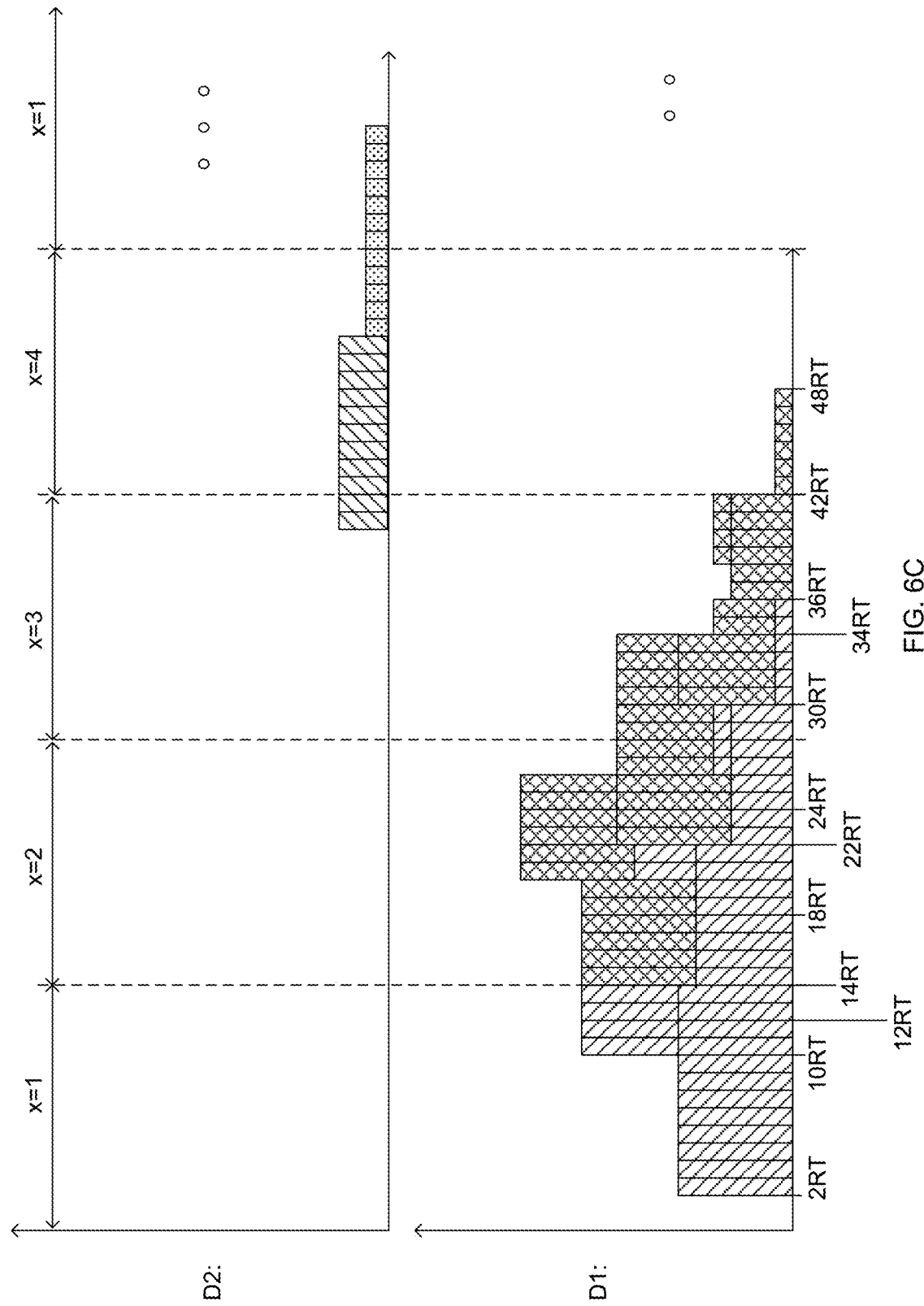
FIG. 6C shows the radar returns of the signal of FIGS. 5D and 6B transmitted into the scene of FIGS. 5B and 6A.

FIG. 6C shows the radar returns of the signal of FIGS. 5D and 6B transmitted into the scene of FIGS. 5B and 6A. The returns for direction D1 are as shown in, and described with reference to, FIG. 5B. For direction D2, the reflections of $S_3$ from object $502_5$ arrive from 40RT to 52RT; reflections of $S_4$ from object $502_5$ arrive from time 52RT to time 64RT.

Figure 6D:
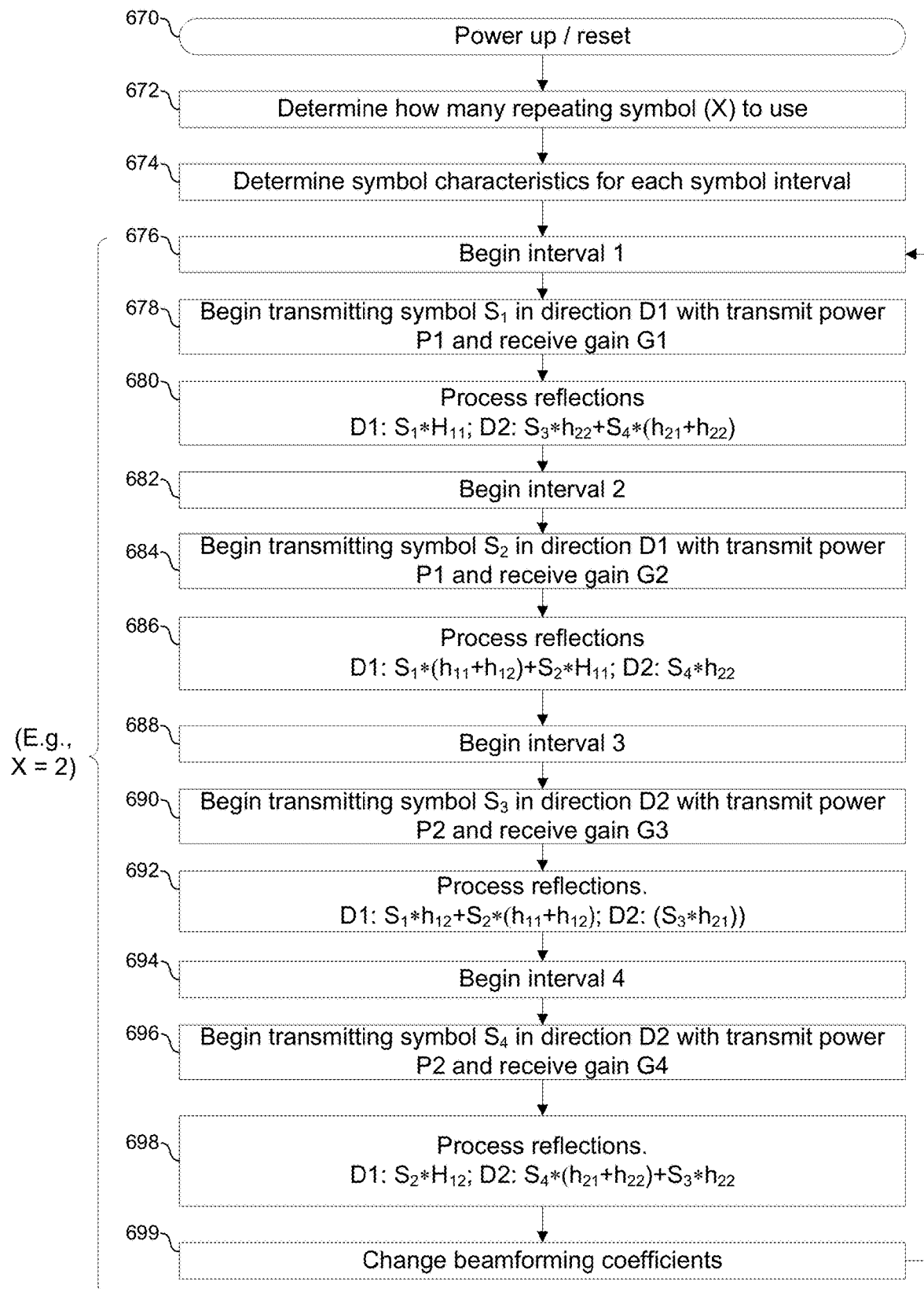
FIG. 6D is a flowchart illustrating gain control in a phased array radar system in accordance with an example implementation of this disclosure.

FIG. 6D is a flowchart illustrating gain control in a phased array radar system in accordance with an example implementation of this disclosure. Blocks 670-674 are substantially similar to blocks 570-574 of FIG. 5F.

In block 676, time interval 1 (corresponding to, for example, the interval from 0 to 12RT in FIGS. 5C-5E, 6B, and 6C) begins.

In block 678, phased array radar system 100 begins transmitting the first repeating symbol, denoted $S_1$, at transmit power $P_1$ in direction D1.

In block 680, phased array radar system 100 sets its gain to $G_1$ and receives and processes reflections. During a first occurrence of block 680, it receives and processes—using beamforming coefficients for D1—reflections of $S_1$ from the portion of the scene corresponding to $h_{11}$. Thus, the reflections during a first occurrence of block 680 are equal to the convolution of $S_1$ with the channel response $h_{11}$. Since $S_1$ is known, the receiver can process the reflections to generate an estimate of $h_{11}$.

During second and subsequent occurrences of block 680, the phased array system 100 also receives and processes—using beamforming coefficients for D2—reflections of $S_3$ from the portion of the scene corresponding to $h_{22}$, and reflections of $S_4$ from the portions of the scene corresponding to $h_{21}$ and $h_{22}$. Thus, reflections during second and subsequent occurrences of block 680 can be denoted $S_1*h_{11}+S_3*h_{22}+S_4*(h_{21}+h_{22})$. The receiver can use the known symbols $S_1$, $S_3$ and $S_4$, along with the previously-generated estimates of $h_{11}$, $h_{21}$ and $h_{22}$ to improve the estimates of $h_{11}$, $h_{21}$ and $h_{22}$.

In block 682, time interval 2 (corresponding to, for example, the interval from 12RT to 24RT in FIGS. 5C-5E, 6B, and 6C) begins.

In block 684, the phased array radar system 100 begins transmitting the second of the repeating symbols, denoted $S_2$ (transmission of $S_1$ ceased prior to time interval 2), at transmit power $P_2$ in direction D1. In an example implementation $P_2$ is less than $P_1$ to limit de-sensitization of the receiver(s) of phased array radar system 100 during reception of reflections of $S_1$ during interval 2.

In block 686, phased array radar system 100 sets it's receive gain to $G_2$ and receives and processes reflections. During a first occurrence of block 686, the receiver receives and processes—using beamforming coefficients for D1—reflections of $S_1$ from the portions of the scene corresponding to $h_{11}$ and $h_{12}$, and reflections of $S_2$ from portions of the scene corresponding to $h_{11}$. Thus, the reflections during a first occurrence of block 686 can be represented as $S_1*(h_{11}+h_{12})+S_2*h_{11}$. The receiver can use the known symbols $S_1$ and $S_2$, along with the previously-generated estimate of $h_{11}$, to improve the estimate of $h_{11}$ as well as generate an initial estimate of $h_{12}$.

During second and subsequent occurrences of block 686, the receiver also receives and processes—using beamforming coefficients for D2—reflections of $S_4$ from the portion of the scene corresponding to $h_{22}$. Thus, reflections during second and subsequent occurrences of block 686 can be denoted $S_1*(h_{11}+h_{12})+S_2*h_{11}+S_4*h_{22}$. The receiver can use the known symbols $S_1$, $S_2$, and $S_4$ along with previously-generated channel estimates to improve the channel estimates.

In block 688, time interval 3 (corresponding to, for example, the interval from 24RT to 36RT in FIGS. 5C-5E, 6B, and 6C) begins, and the phased array radar system 100 begins transmitting symbols $S_3$ at power P3 in direction D2.

In block 690, the phased array radar system 100 begins transmitting the third of the repeating symbols, denoted $S_3$ (transmission of $S_1$ and $S_2$ ceased prior to time interval 3), at transmit power $P_3$ in direction D2. In an example implementation $P_3$ is less than $P_2$ and $P_1$ to limit de-sensitization of the receiver(s) of phased array radar system 100 during reception of reflections of $S_1$ and $S_2$ during interval 3.

In block 692, phased array radar system 100 sets it's receive gain to $G_3$ and receives and processes reflections. During a first occurrence of block 692, the receiver receives and processes—using beamforming coefficients for D1—reflections of $S_1$ from the portion of the scene corresponding to $h_{12}$, and reflections of $S_2$ from portions of the scene corresponding to $h_{11}$ and $h_{12}$. Thus, the reflections during a first occurrence of block 692 can be represented as $S_1*h_{12}+S_2*(h_{11}+h_{12})$ The receiver can use the known symbols $S_1$ and $S_2$, along with the previously-generated estimates of $h_{11}$ and $h_{12}$ to improve the estimates of $h_{11}$ and $h_{12}$.

During second and subsequent occurrences of block 692, the receiver also receives and processes—using beamforming coefficients for D2—reflections of $S_3$ from the portion of the scene corresponding to $h_{21}$. Thus, reflections during second and subsequent occurrences of block 692 can be denoted $S_1*h_{12}+S_2*(h_{11}+h_{12})+S_3*h_{21}$. The receiver can use the known symbols $S_1$, $S_2$, and $S_3$ along with previously-generated channel estimates to improve the channel estimates.

In block 694, time interval 4 (corresponding to, for example, the interval from 36RT to 48RT in FIGS. 5C-5E, 6B, and 6C) begins.

In block 696, the phased array radar system 100 begins transmitting the fourth of the repeating symbols, denoted $S_4$ (transmission of $S_1$, $S_2$, and $S_3$ ceased prior to time interval 4), at transmit power $P_4$ in direction D2. In an example implementation $P_4$ is less than $P_3$, $P_2$ and $P_1$ to limit de-sensitization of the receiver(s) of phased array radar system 100 during reception of reflections of $S_2$, $S_3$, and $S_4$ during interval 4.

In block 698, phased array radar system 100 sets it's receive gain to $G_4$ and receives and processes reflections. During a first occurrence of block 698, the receiver receives and processes—using beamforming coefficients for D1—reflections of $S_2$ from portions of the scene corresponding to $h_{12}$. Thus, the reflections during a first occurrence of block 698 can be represented as $S_2*h_{12}$. The receiver can use the known symbol $S_2$ along with the previously-generated estimate of $h_{12}$ to improve the estimate of $h_{12}$.

During second and subsequent occurrences of block 698, the receiver also receives and processes—using beamforming coefficients for D2—reflections of $S_3$ from the portion of the scene corresponding to $h_{22}$, and reflections of $S_4$ from the portions of the scene corresponding to $h_{21}$ and $h_{22}$. Thus, reflections during second and subsequent occurrences of block 698 can be denoted $S_2*h_{12}+S_3*h_{22}+S_4*(h_{21}+h_{22})$. The receiver can use the known symbols $S_2$, $S_3$, and $S_4$ along with previously-generated channel estimates to improve the channel estimates.

In block 699, the phased array system 100 changes the beamforming coefficients to change the directions at which it transmits and/or receives and then the process of transmitting the repeating symbols repeats by returning to block 676. For example, in a first pass through blocks 676-698, D1 may be 0° and D2 may be 20° and in a second pass through 676-698, D1 may be 20° and D2 may be 0°. The scene representation for 20° generated with symbols $S_3$ and $S_4$ in the first pass may be combined with the scene representation generated with symbols $S_1$ and $S_2$ in the second pass to generate an aggregate scene representation for each of Y (an integer) at the time period of the sweep. The Y scene representations corresponding to the Y angles may then be combined to generate a single overall scene representation for the time period of the sweep. Each of the N transceivers 111$_n$ may generate such a scene representation and then convey its scene representation to one of the N transceivers designated as an aggregating node. The aggregating Node then combines the N scene representations into a single scene representation for the time period of the sweep and conveys it to the host system (e.g., computing system 410 of an automobile 400 to which the phased array radar system 100 is mounted).

While the present disclosure specifically addresses aspects of the invention in connection with an automobile, the disclosure contemplates that aspects of the invention may be used in connection with any type of vehicle or mobile machinery.

In accordance with an example implementation of this disclosure, a radar system (e.g., 100) comprises a transmitter (e.g., portions of 110$_n$) and a receiver (e.g., portions of 110$_n$). The radar system is operable to define a near range (e.g., from the radar system 100 to the boundary 501) and a far range (e.g., from boundary 501 to boundary 503). The radar system is operable to, during each one of a plurality of time intervals (e.g., 0 to 12RT, 12RT to 24RT, 24RT to 36RT, 36RT to 48RT in FIG. 6B), repeatedly transmit, via the transmitter, a plurality of OFDM symbols (e.g., $S_1$, $S_2$, $S_3$, and $S_4$). The transmitter is operable to select a transmit power for the transmission during the one of the time intervals based on from which of the near range and the far range reflections of the OFDM symbols are to be received during the one of the time intervals. The receiver is operable to receive reflections of the OFDM symbols, and process, in the receiver, the reflections of the OFDM symbols to detect objects within the near range and the far range. The transmitter may be operable to, for a first time interval of the plurality of time intervals in which the reflections of the OFDM symbols arrive from the near range but not the far range (e.g., 0 to 12RT in FIG. 6B), select a first, higher power (e.g., $P_1$) for the transmit power, and for a second time interval of the plurality of time intervals in which the reflections of the OFDM symbols arrive from the far range (e.g., 24RT to 36RT in FIG. 6B), select a second, lower power (e.g., $P_3$) for the transmit power. The receiver may be operable to during each one of the plurality of time intervals (e.g., 0 to 12RT, 12RT to 24RT, 24RT to 36RT, 36RT to 48RT in FIG. 6B), select a receiver gain for reception of the reflections of the OFDM symbols during the one of the time intervals based on from which of the near range and the far range reflections of the OFDM symbols are to be received during the one of the time intervals. The transmitter may be operable to for a first time interval of the plurality of time intervals in which reflections of the OFDM symbols arrive from the near range but not the far range (e.g., 0 to 12RT in FIG. 6B), select a first, lower gain (e.g., $G_1$) for the receiver gain, and for a second time interval of the plurality of time intervals in which reflections of the OFDM symbols arrive from the far range (e.g., 24RT to 36RT), select a second, higher gain (e.g., $G_3$) for the receiver gain. The transmitter may be operable to repeatedly transmit only a first (e.g., $S_1$) of the OFDM symbols during a first time interval of the plurality of time intervals, and repeatedly transmit only a second (e.g., $S_2$) of the OFDM symbol during a second time interval of the plurality of time intervals (the transmitter may transmit other, non-interfering signals during the same time interval). The radar system may be operable to set a duration of each of the plurality of time intervals based on length of one or both of the near range and the far range. The radar system may be operable to set a duration of each of a first subset of the plurality of time intervals (e.g., 0 to 12RT and 24RT to 36RT) based on the length of the near range, and set a duration of each of a second subset of the plurality of time intervals (e.g., 12RT to 24RT and 36RT to 48RT) based on the length of the far range. The radar system is operable to set the duration of each of the first subset of the plurality of time intervals to be the roundtrip time of the near range (e.g., 12RT in FIG. 5B), and set the duration of each of the second subset of the plurality of time intervals to be the roundtrip time of the far range (e.g., 12RT in FIG. 5B). The transmitter may be operable to select a transmit power for the transmission during the one of the time intervals based on a direction in which the OFDM symbols are transmitted (e.g., power $P_1$ for direction D1 and power $P_3$ for direction D2). The repeated transmission of a first (e.g., $S_1$) of the OFDM symbols may be in a first direction (e.g., D1) and the repeated transmitting of a second (e.g., $S_3$) of the OFDM symbols is in a second direction (e.g., D2).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, "microwave" frequencies range from approximately 300 MHz to 300 GHz and "millimeter wave" frequencies range from approximately 30 GHz to 300 GHz. Thus, the "microwave" band includes the "millimeter wave" band.

What is claimed is:

1. A system comprising:
a radar system comprising a transmitter and a receiver, wherein the radar system is operable to:
define a near range and a far range;
define a plurality of time intervals;
during each one of the plurality of time intervals:
repeatedly transmit, via the transmitter, a plurality of OFDM symbols; and
select, by the transmitter, a transmit power for a transmission during the one of the time intervals based on from which of the near range and the far range reflections of the OFDM symbols are to be received during the one of the time intervals; and
receive, in the receiver, reflections of the OFDM symbols; and
process, in the receiver, the reflections of the OFDM symbols to detect objects within the near range and the far range.

2. The system of claim 1, wherein the transmitter is operable to:
for a first time interval of the plurality of time intervals in which the reflections of the OFDM symbols arrive from the near range but not the far range, select a first, higher power for the transmit power; and
for a second time interval of the plurality of time intervals in which the reflections of the OFDM symbols arrive from the far range, select a second, lower power for the transmit power.

3. The system of claim 1, wherein the receiver is operable to:
during each one of the plurality of time intervals, select a receiver gain for reception of the reflections of the OFDM symbols during the one of the time intervals based on from which of the near range and the far range reflections of the OFDM symbols are to be received during the one of the time intervals.

4. The system of claim 3, wherein the transmitter is operable to:
for a first time interval of the plurality of time intervals in which reflections of the OFDM symbols arrive from the near range but not the far range, select a first, lower gain for the receiver gain; and
for a second time interval of the plurality of time intervals in which reflections of the OFDM symbols arrive from the far range, select a second, higher gain for the receiver gain.

5. The system of claim 1, wherein the transmitter is operable to:
repeatedly transmit only a first of the OFDM symbols during a first time interval of the plurality of time intervals; and
repeatedly transmit only a second of the OFDM symbols during a second time interval of the plurality of time intervals.

6. The system of claim 1, wherein the radar system is operable to set a duration of each of the plurality of time intervals based on length of one or both of the near range and the far range.

7. The system of claim 6, wherein the radar system is operable to:
set a duration of each of a first subset of the plurality of time intervals based on the length of the near range; and
set a duration of each of a second subset of the plurality of time intervals based on the length of the far range.

8. The system of claim 7, wherein the radar system is operable to:
set the duration of each of the first subset of the plurality of time intervals to be roundtrip time of the near range; and
set the duration of each of the second subset of the plurality of time intervals to be roundtrip time of the far range.

9. The system of claim 1, wherein the transmitter is operable to select the transmit power for the transmission during the one of the time intervals based on a direction in which the OFDM symbols are transmitted.

10. The system of claim 9, wherein the repeated transmission of a first of the OFDM symbols is in a first direction and the repeated transmission of a second of the OFDM symbols is in a second direction.

11. A method comprising:
defining, by a radar system, a near range and a far range;
defining a plurality of time intervals;
during each one of the plurality of time intervals:
repeatedly transmitting, by a transmitter of the radar system, a plurality of OFDM symbols; and
selecting, by the transmitter of the radar system, a transmit power for the transmitting during the one of the time intervals based on from which of the near range and the far range reflections of the OFDM symbols are to be received during the one of the time intervals; and
receiving, by a receiver of the radar system, reflections of the OFDM symbols; and
processing, by the receiver of the radar system, the reflections of the OFDM symbols to detect objects within the near range and the far range.

12. The method of claim 11, comprising:
for a first time interval of the plurality of time intervals in which the reflections of the OFDM symbols arrive from the near range but not the far range, selecting, by the transmitter of the radar system, a first, higher power for the transmit power; and
for a second time interval of the plurality of time intervals in which the reflections of the OFDM symbols arrive from the far range, selecting, by the transmitter of the radar system, a second, lower power for the transmit power.

13. The method of claim 11, comprising:
during each one of the plurality of time intervals, selecting, by the receiver of the radar system, a receiver gain for receiving the reflections of the OFDM symbols during the one of the time intervals based on from which of the near range and the far range reflections of the OFDM symbols are to be received during the one of the time intervals.

14. The method of claim 13, comprising:
for a first time interval of the plurality of time intervals in which reflections of the OFDM symbols arrive from the near range but not the far range, selecting, by the transmitter of the radar system, a first, lower gain for the receiver gain; and
for a second time interval of the plurality of time intervals in which reflections of the OFDM symbols arrive from the far range, selecting, by the transmitter of the radar system, a second, higher gain for the receiver gain.

15. The method of claim 11, comprising:
repeatedly transmitting, by the transmitter of the radar system, only a first of the OFDM symbols during a first time interval of the plurality of time intervals; and repeatedly transmitting, by the transmitter of the radar system, only a second of the OFDM symbols during a second time interval of the plurality of time intervals.

16. The method of claim 11, comprising setting a duration of each of the plurality of time intervals based on length of one or both of the near range and the far range.

17. The method of claim 16, comprising:
setting a duration of each of a first subset of the plurality of time intervals based on the length of the near range; and
setting a duration of each of a second subset of the plurality of time intervals based on the length of the far range.

18. The method of claim 17, comprising:
setting the duration of each of the first subset of the plurality of time intervals to be roundtrip time of the near range; and
setting the duration of each of the second subset of the plurality of time intervals to be roundtrip time of the far range.

19. The method of claim 11, comprising selecting, by the transmitter of the radar system, a transmit power for the transmitting during the one of the time intervals based on a direction in which the OFDM symbols are transmitted.

20. The method of claim 19, wherein the repeated transmitting of a first of the OFDM symbols is in a first direction and the repeated transmitting of a second of the OFDM symbols is in a second direction.

* * * * *